(12) United States Patent
Zhang et al.

(10) Patent No.: US 9,749,703 B2
(45) Date of Patent: Aug. 29, 2017

(54) DATA TRANSMISSION METHOD, DEVICE, AND SYSTEM

(71) Applicant: HUAWEI TECHNOLOGIES CO., LTD., Shenzhen, Guangdong (CN)

(72) Inventors: Lixue Zhang, Beijing (CN); De Chen, Beijing (CN); Xin Xiong, Beijing (CN); Yue Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 226 days.

(21) Appl. No.: 14/495,157

(22) Filed: Sep. 24, 2014

(65) Prior Publication Data
US 2015/0009820 A1    Jan. 8, 2015

Related U.S. Application Data

(63) Continuation of application No. PCT/CN2012/073055, filed on Mar. 26, 2012.

(51) Int. Cl.
*H04N 21/61*    (2011.01)
*H04N 21/6332*    (2011.01)
(Continued)

(52) U.S. Cl.
CPC ......... *H04N 21/6332* (2013.01); *H04L 65/80* (2013.01); *H04N 7/18* (2013.01);
(Continued)

(58) Field of Classification Search
CPC .............................. H04N 7/18; H04N 21/6332
See application file for complete search history.

(56) References Cited

U.S. PATENT DOCUMENTS 8,935,313 B2 * 1/2015 Sherer ................. H04L 12/1881
709/202
2007/0230742 A1 * 10/2007 Burns .................. G06T 7/2073
382/103
(Continued)

FOREIGN PATENT DOCUMENTS

CN    101068345    11/2007
CN    101431812 A    5/2009
(Continued)

OTHER PUBLICATIONS

Japanese Office Action mailed Dec. 15, 2015 in corresponding Japanese Patent Application No. 2015-502037.
(Continued)

*Primary Examiner* — Hoon J Chung
*Assistant Examiner* — Zhensheng Zhang
(74) *Attorney, Agent, or Firm* — Staas & Halsey LLP

(57) ABSTRACT

A data transmission method is disclosed. N streams of video data uploaded by a video capture terminal are received, where N is an integer greater than or equal to 1; loopback indication information sent by a mobility management entity or the video capture terminal is received, where the loopback indication information carries an identifier of a bearer of video data to be looped back; according to the identifier of the bearer of the video data to be looped back, the video data to be looped back corresponding to the identifier of the bearer of the video data to be looped back is confirmed; and the video data to be looped back is sent to a trunking terminal. In the data transmission method, data that the trunking terminal needs to monitor is directly looped back at the base station.

12 Claims, 13 Drawing Sheets

(51) Int. Cl.
*H04N 21/2743* (2011.01)
*H04L 29/06* (2006.01)
*H04N 7/18* (2006.01)

(52) U.S. Cl.
CPC ..... *H04N 21/2743* (2013.01); *H04N 21/6131* (2013.01); *H04N 21/6181* (2013.01)

(56) References Cited

U.S. PATENT DOCUMENTS

| | | |
|---|---|---|
| 2008/0084871 A1 | 4/2008 | Wang et al. |
| 2010/0020779 A1 | 1/2010 | Kalhan et al. |

FOREIGN PATENT DOCUMENTS

| | | |
|---|---|---|
| CN | 101790246 A | 7/2010 |
| CN | 101989994 | 3/2011 |
| CN | 102036187 | 4/2011 |
| CN | 102111608 | 6/2011 |
| EP | 2 207 399 A1 | 7/2010 |
| EP | 2207399 A1 | 7/2010 |
| JP | 10-262237 | 9/1998 |
| JP | 2006-13640 | 1/2006 |
| JP | 2008-511218 | 4/2008 |
| WO | 2011/113207 A1 | 9/2011 |
| WO | 2011/126511 A1 | 10/2011 |

OTHER PUBLICATIONS

Chinese Office Action dated Apr. 22, 2016 in corresponding to Chinese Patent Application No. 201280000712.2.
Extended European Search Report dated May 15, 2015 in corresponding European Patent Application No. 12872649.4.
Budka et al., "Public Safety Mission Critical Voice Services Over LTE", Bell Labs Technical Journal 16(3), 2011, pp. 133-149.
"3rd Generation Partnership Project; Technical Specification Group Services and System Aspects; 3GPP enablers for Open Mobile Alliance (OMA); Push-to-talk over Cellular (PoC) services; Stage 2 (Release 9)", 3GPP TR 23.979 V9.0.0, Dec. 2009, pp. 1-38.
European Office Action dated Nov. 12, 2014 in corresponding European Patent Application No. 12872649.4.
PCT International Search Report and Written Opinion of the International Searching Authority dated Nov. 29, 2012 in corresponding International Patent Application No. PCT/CN2012/073055.
International Search Report mailed Nov. 29, 2012, in corresponding International Patent Application No. PCT/CN2012/073055.

* cited by examiner

DATA TRANSMISSION METHOD, DEVICE, AND SYSTEM

CROSS-REFERENCE TO RELATED APPLICATIONS

This application is a continuation of International Application No. PCT/CN2012/073055, filed on Mar. 26, 2012, which is hereby incorporated by reference in its entirety.

TECHNICAL FIELD

The present invention relates to the field of communications technologies, and in particular, to a data transmission method, device, and system.

BACKGROUND

Video surveillance is always one of hot application technologies in the information field, and is widely concerned by people due to its features of intuition, convenience, and rich information content. With rapid development of an embedded technology, a video processing technology, and a network transmission technology, a video surveillance system is vigorously developing towards a direction of digitized, networked, and integrated embedded video surveillance. With development of broadband trunking communications, video data obtained by real-time video surveillance will become an important requirement of a user in a trunking communications system. For example, video data obtained by surveillance in an airport, a hotel, a shopping mall, and the like is effectively and rapidly sent to a trunking terminal for policing and fire control and the like, which can effectively assist policemen in arresting criminals and firemen in fire extinguishing.

A combination of a conventional video surveillance technology and the Internet may implement remote access. However, due to a factor such as a network bandwidth and a transmission distance, a long delay is always generated in network transmission using the Internet, and a real-time surveillance requirement cannot be ensured.

SUMMARY

Embodiments of the present invention provide a data transmission method, which may reduce a transmission delay and transmit video data obtained by video surveillance to a trunking terminal in real time.

A data transmission method includes:

receiving N streams of video data uploaded by a video capture terminal;

receiving loopback indication information sent by a mobility management entity or the video capture terminal, where the loopback indication information carries an identifier of a bearer of video data to be looped back, where the identifier of the bearer is an identifier of each bearer among N bearers that are set up by the mobility management entity according to a bearer setup request of the video capture terminal and are used for transmitting the N streams of video data, where the bearer setup request carries a serial number of the N streams of video data, the serial number of each stream of video data corresponds to the identifier of the bearer used for transmitting each stream of video data, and the identifier of the bearer of the video data to be looped back is determined by the mobility management entity or the video capture terminal according to a serial number of the video data to be looped back carried in a video loopback request of a dispatch station, where N is an integer greater than or equal to 1;

confirming, according to the identifier of the bearer of the video data to be looped back, the video data to be looped back corresponding to the identifier of the bearer of the video data to be looped back; and sending the video data to be looped back to a trunking terminal.

A data transmission method includes:

receiving a bearer setup request sent by a video capture terminal, where the bearer setup request carries a serial number of N streams of video data;

setting up N evolved packet bearers, each of which is used to transmit one of the N streams of video data, and correspondingly storing an identifier of the bearer used for transmitting the one stream of video data and a serial number of the one stream of data transmitted on the bearer, where N is an integer greater than or equal to 1;

receiving a video loopback request sent by a dispatch station, where the video loopback request carries a serial number of video data to be looped back;

searching, according to the serial number of the video data to be looped back, stored mapping relationship between a serial number of video data and an identifier of a bearer, for an identifier of a bearer corresponding to the serial number of the video data to be looped back; and sending loopback indication information to a base station, where the loopback indication information carries the found identifier of the bearer of the video data to be looped back, so that the base station confirms, according to the identifier of the bearer of the video data to be looped back, the video data to be looped back corresponding to the identifier of the bearer of the video data to be looped back, and sends the video data to be looped back to a trunking terminal.

A data transmission method includes:

after receiving M video data serial numbers reported by a video capture terminal, instructing the video capture terminal to report video data corresponding to N video data serial numbers specified in the M video data serial numbers, where M is greater than or equal to N, and N is an integer greater than or equal to 1;

after receiving N streams of video data uploaded by the video capture terminal, confirming video data to be looped back; and sending a video loopback request to a mobility management entity or the video capture terminal, where the video loopback request carries a serial number of the video data to be looped back, so that the mobility management entity or the video capture terminal confirms, according to the serial number of the video data to be looped back, an identifier of a bearer of the video data to be looped back corresponding to the serial number of the video data to be looped back, so that a base station confirms, according to the identifier of the bearer of the video data to be looped back, the video data to be looped back corresponding to the identifier of the bearer of the video data to be looped back, and sends the video data to be looped back to a trunking terminal, where the identifier of the bearer is an identifier of each bearer among N bearers that are set up by the mobility management entity according to a bearer setup request of the video capture terminal and are used for transmitting the N streams of video data, where the bearer setup request carries a serial number of the N streams of video data, and the serial number of each stream of video data corresponds to the identifier of the bearer used for transmitting each stream of video data.

A data transmission method includes:

after negotiating with a dispatch station about a serial number of N streams of video data to be reported, sending the N streams of video data corresponding to the serial number of the N streams of video data to a base station, and sending a bearer setup request to a mobility management entity, where the bearer setup request carries the serial number of the N streams of video data, so that the mobility management entity sets up N evolved packet bearers, each of which is used to transmit one of the N streams of video data, and correspondingly stores an identifier of each bearer used for transmitting the one stream of video data and a serial number of the one stream of video data transmitted on the bearer;

receiving a video loopback request sent by the dispatch station, where the video loopback request carries a serial number of video data to be looped back;

determining, according to the serial number of the video data to be looped back carried in the video loopback request of the dispatch station, an identifier of a bearer of the video data to be looped back; and sending loopback indication information to the base station, where the loopback indication information carries the identifier of the bearer of the video data to be looped back, so that the base station confirms, according to the identifier of the bearer of the video data to be looped back, the video data to be looped back corresponding to the identifier of the bearer of the video data to be looped back, and sends the video data to be looped back to a trunking terminal.

A data transmission method includes:

sending a bearer setup request to a mobility management entity, where the bearer setup request carries a serial number of N streams of video data, so that the mobility management entity sets up N evolved packet bearers, each of which is used to transmit one of the N streams of video data;

receiving a monitoring parameter sent by a base station and corresponding to each stream of video data in the N streams of video data, and sending the serial number of the N streams of video data and the monitoring parameter corresponding to the serial number of each stream of video data in the N streams of video data to a trunking terminal; and broadcasting the N streams of video data, so that a dispatch station sends monitoring indication information to the trunking terminal according to the N streams of video data, where the monitoring indication information carries a serial number of video data specified to be monitored in the N streams of video data, so that the trunking terminal searches, according to the serial number of the video data specified to be monitored, for a monitoring parameter corresponding to the serial number of the video data specified to be monitored, and uses the found monitoring parameter of the video data specified to be monitored, to monitor the video data specified to be monitored.

A data transmission method includes:

receiving monitoring indication information sent by a dispatch station, where the monitoring indication information carries an identifier of a trunking terminal included in each trunking terminal group that needs to monitor video data specified to be monitored and a serial number of the video data that all trunking terminals in each trunking terminal group specify to monitor;

receiving a serial number of N streams of video data and a monitoring parameter corresponding to the serial number of each stream of video data in the N streams of video data, which are sent by a video capture terminal;

confirming, according to an identifier of a trunking terminal itself, a serial number of the video data specified to be monitored that all trunking terminals in a trunking terminal group including the trunking terminal itself need to monitor, among the identifier of the trunking terminal included in each trunking terminal group and the serial number of the video data that all trunking terminals in each trunking terminal group specify to monitor;

searching, according to the serial number of the video data specified to be monitored, for a monitoring parameter corresponding to the serial number of the video data specified to be monitored; and using the found monitoring parameter of the video data specified to be monitored, to monitor the video data specified to be monitored.

A data transmission method includes:

receiving N streams of video data broadcasted by a video capture terminal;

configuring a monitoring parameter for each stream of video data in the N streams of video data; and sending the monitoring parameter corresponding to each stream of video data in the N streams of video data to the video capture terminal, so that the video capture terminal sends a serial number of the N streams of video data and the monitoring parameter corresponding to the serial number of each stream of video data in the N streams of video data to a trunking terminal, so that the trunking terminal searches, according to a serial number of video data specified to be monitored, for a monitoring parameter corresponding to the serial number of the video data specified to be monitored, and uses the found monitoring parameter of the video data specified to be monitored, to monitor the video data specified to be monitored.

A data transmission method includes:

after receiving N streams of video data, sending monitoring indication information to a trunking terminal, where the monitoring indication information carries an identifier of a trunking terminal included in each trunking terminal group that needs to monitor video data specified to be monitored and a serial number of the video data that all trunking terminals in each trunking terminal group specify to monitor, so that the trunking terminal confirms, according to an identifier of the trunking terminal itself, a serial number of the video data specified to be monitored that all trunking terminals in a trunking terminal group including the trunking terminal itself need to monitor, searches, according to the serial number of the video data specified to be monitored, for a monitoring parameter corresponding to the serial number of the video data specified to be monitored, and uses the found monitoring parameter of the video data specified to be monitored, to monitor the video data specified to be monitored;

where the monitoring parameter is a monitoring parameter that is sent, along with a serial number of the N streams of video data, to the trunking terminal by a video capture terminal, where the serial number of the N streams of video data and the monitoring parameter are sent by a base station to the video capture terminal after the base station receives the N streams of video data broadcasted by the video capture terminal; and the monitoring parameter corresponds to a serial number of each stream of video data among the N streams of video data.

A base station includes:

a receiving unit, configured to receive N streams of video data uploaded by a video capture terminal, and receive loopback indication information sent by a mobility management entity or the video capture terminal, where the loopback indication information carries an identifier of a bearer of video data to be looped back, where the identifier of the bearer is an identifier of each bearer among N bearers that are set up by the mobility management entity according to a bearer setup request of the video capture terminal and are used for transmitting the N streams of video data, where the bearer setup request carries a serial number of the N streams of video data, the serial number of each stream of video data corresponds to the identifier of the bearer used for transmitting each stream of video data, and the identifier of the bearer of the video data to be looped back is determined by the mobility management entity or the video capture terminal according to a serial number of the video data to be looped back carried in a video loopback request of a dispatch station, where N is an integer greater than or equal to 1;

a confirming unit, configured to confirm, according to the identifier of the bearer of the video data to be looped back received by the receiving unit, the video data to be looped back corresponding to the identifier of the bearer of the video data to be looped back; and a sending unit, configured to send the video data to be looped back confirmed by the confirming unit to a trunking terminal.

A mobility management entity includes:

a receiving unit, configured to receive a bearer setup request sent by a video capture terminal, where the bearer setup request carries a serial number of N streams of video data;

a bearer setup unit, configured to set up N evolved packet bearers after the receiving unit receives the bearer setup request, where each bearer is used to transmit one of the N streams of video data;

a storing unit, configured to correspondingly store, after the bearer setup unit sets up the bearers, an identifier of each bearer used for transmitting the one stream of video data and a serial number of the one stream of video data transmitted on the bearer, where N is an integer greater than or equal to 1;

where the receiving unit is further configured to receive a video loopback request sent by a dispatch station, where the video loopback request carries a serial number of video data to be looped back;

a searching unit, configured to search, according to the serial number of the video data to be looped back received by the receiving unit, the stored mapping relationship between a serial number of video data and an identifier of a bearer, for an identifier of a bearer corresponding to the serial number of the video data to be looped back; and a sending unit, configured to send loopback indication information to a base station, where the loopback indication information carries the found identifier of the bearer of the video data to be looped back, so that the base station confirms, according to the identifier of the bearer of the video data to be looped back, the video data to be looped back corresponding to the identifier of the bearer of the video data to be looped back, and sends the video data to be looped back to a trunking terminal.

A dispatch station includes:

a receiving unit, configured to instruct, after receiving M video data serial numbers reported by a video capture terminal, the video capture terminal to report video data corresponding to N video data serial numbers specified in the M video data serial numbers, where M is greater than or equal to N, and N is an integer greater than or equal to 1; and receive N streams of video data uploaded by the video capture terminal;

a confirming unit, configured to confirm, after the receiving unit receives the N streams of video data uploaded by the video capture terminal, video data to be looped back; and a sending unit, configured to send a video loopback request to a mobility management entity or the video capture terminal after the confirming unit confirms the video data to be looped back, where the video loopback request carries a serial number of the video data to be looped back, so that the mobility management entity or the video capture terminal confirms, according to the serial number of the video data to be looped back, an identifier of a bearer of the video data to be looped back corresponding to the serial number of the video data to be looped back, so that a base station confirms, according to the identifier of the bearer of the video data to be looped back, the video data to be looped back corresponding to the identifier of the bearer of the video data to be looped back, and sends the video data to be looped back to a trunking terminal, where the identifier of the bearer is an identifier of each bearer among N bearers that are set up by the mobility management entity according to a bearer setup request of the video capture terminal and are used for transmitting the N streams of video data, where the bearer setup request carries a serial number of the N streams of video data, and the serial number of each stream of video data corresponds to the identifier of the bearer used for transmitting each stream of video data.

A video capture terminal includes:

a sending unit, configured to send, after negotiating with a dispatch station about a serial number of N streams of video data to be reported, the N streams of video data corresponding to the serial number of the N streams of video data to a base station, and send a bearer setup request to a mobility management entity, where the bearer setup request carries the serial number of the N streams of video data, so that the mobility management entity sets up N evolved packet bearers, each of which is used to transmit one of the N streams of video data, and correspondingly stores an identifier of each bearer used for transmitting the one stream of video data and a serial number of the one stream of video data transmitted on the bearer;

a receiving unit, configured to receive a video loopback request sent by the dispatch station, where the video loopback request carries a serial number of video data to be looped back; and a determining unit, configured to determine, according to the serial number of the video data to be looped back carried in the video loopback request received by the receiving unit, an identifier of a bearer of the video data to be looped back;

where the sending unit is further configured to send loopback indication information to the base station, where the loopback indication information carries the identifier of the bearer of the video data to be looped back, so that the base station confirms, according to the identifier of the bearer of the video data to be looped back, the video data to be looped back corresponding to the identifier of the bearer of the video data to be looped back, and sends the video data to be looped back to a trunking terminal.

A video capture terminal includes:

a sending unit, configured to send a bearer setup request to a mobility management entity, where the bearer setup request carries a serial number of N streams of video data, so that the mobility management entity sets up N evolved packet bearers, each of which is used to transmit one of the N streams of video data;

a receiving unit, configured to receive a monitoring parameter sent by a base station and corresponding to each stream of video data in the N streams of video data;

where the sending unit is further configured to send the serial number of the N streams of video data and the monitoring parameter received by the receiving unit and corresponding to the serial number of each stream of video data in the N streams of video data to a trunking terminal; and a broadcasting unit, configured to broadcast the N streams of video data, so that a dispatch station sends monitoring indication information to the trunking terminal according to the N streams of video data, where the monitoring indication information carries a serial number of video data specified to be monitored in the N streams of video data, so that the trunking terminal searches, according to the serial number of the video data specified to be monitored, for a monitoring parameter corresponding to the serial number of the video data specified to be monitored, and uses the found monitoring parameter of the video data specified to be monitored, to monitor the video data specified to be monitored.

A trunking terminal includes:

a receiving unit, configured to receive monitoring indication information sent by a dispatch station, where the monitoring indication information carries an identifier of a trunking terminal included in each trunking terminal group that needs to monitor video data specified to be monitored and a serial number of the video data that all trunking terminals in each trunking terminal group specify to monitor; and receive a serial number of N streams of video data and a monitoring parameter corresponding to the serial number of each stream of video data in the N streams of video data, which are sent by a video capture terminal;

a confirming unit, configured to confirm, according to an identifier of the trunking terminal itself, a serial number of the video data specified to be monitored that all trunking terminals in a trunking terminal group including the trunking terminal itself need to monitor, among the identifier that is of the trunking terminal included in each trunking terminal group and is carried in the monitoring indication information received by the receiving unit and the serial number of the video data that all trunking terminals in each trunking terminal group specify to monitor;

a searching unit, configured to search, according to the serial number that is of the video data specified to be monitored and is confirmed by the confirming unit, for a monitoring parameter corresponding to the serial number of the video data specified to be monitored; and a monitoring unit, configured to use the monitoring parameter that is of the video data specified to be monitored and is found by the searching unit, to monitor the video data specified to be monitored.

A base station includes:

a receiving unit, configured to receive N streams of video data broadcasted by a video capture terminal;

a configuring unit, configured to configure a monitoring parameter for each stream of video data in the N streams of video data received by the receiving unit; and a sending unit, configured to send the monitoring parameter configured by the configuring unit for each stream of video data in the N streams of video data to the video capture terminal, so that the video capture terminal sends a serial number of the N streams of video data and the monitoring parameter corresponding to the serial number of each stream of video data in the N streams of video data to a trunking terminal, so that the trunking terminal searches, according to a serial number of video data specified to be monitored, for a monitoring parameter corresponding to the serial number of the video data specified to be monitored, and uses the found monitoring parameter of the video data specified to be monitored, to monitor the video data specified to be monitored.

A dispatch station includes:

a receiving unit, configured to receive N streams of video data; and a sending unit, configured to send monitoring indication information to a trunking terminal after the receiving unit receives the N streams of video data, where the monitoring indication information carries an identifier of a trunking terminal included in each trunking terminal group that needs to monitor video data specified to be monitored and a serial number of the video data that all trunking terminals in each trunking terminal group specify to monitor, so that the trunking terminal confirms, according to an identifier of the trunking terminal itself, a serial number of the video data specified to be monitored that all trunking terminals in a trunking terminal group including the trunking terminal itself need to monitor, searches, according to the serial number of the video data specified to be monitored, for a monitoring parameter corresponding to the serial number of the video data specified to be monitored, and uses the found monitoring parameter of the video data specified to be monitored, to monitor the video data specified to be monitored;

where the monitoring parameter is a monitoring parameter that is sent, along with a serial number of the N streams of video data, to the trunking terminal by a video capture terminal, where the serial number of the N streams of video data and the monitoring parameter are sent by a base station to the video capture terminal after the base station receives the N streams of video data broadcasted by the video capture terminal; and the monitoring parameter corresponds to a serial number of each stream of video data among the N streams of video data.

A video surveillance system includes a trunking terminal, a video capture terminal, a base station, a mobility management entity, a serving gateway, a packet data network gateway, and a dispatch station, where:

the video capture terminal sends a bearer setup request to the mobility management entity after negotiating with the dispatch station about a serial number of N streams of video data to be reported, where the bearer setup request carries the serial number of the N streams of video data;

the mobility management entity sets up N evolved packet bearers, each of which is used to transmit one of the N streams of video data, and correspondingly stores an identifier of each bearer used for transmitting the one stream of video data and a serial number of the one stream of video data transmitted on the bearer, where N is an integer greater than or equal to 1;

the mobility management entity or the video capture terminal receives a video loopback request sent by the dispatch station, where the video loopback request carries a serial number of video data to be looped back, so that the mobility management entity or the video capture terminal confirms, according to the serial number of the video data to be looped back, an identifier of a bearer of the video data to be looped back corresponding to the serial number of the video data to be looped back;

the base station receives loopback indication information sent by the mobility management entity or the video capture terminal, where the loopback indication information carries the identifier of the bearer of the video data to be looped back, confirms, according to the identifier of the bearer of the video data to be looped back, the video data to be looped back corresponding to the identifier of the bearer of the video data to be looped back, and sends the video data to be looped back to the trunking terminal; and the trunking terminal monitors the video data to be looped back.

A video surveillance system includes a trunking terminal, a video capture terminal, a base station, a mobility management entity, a serving gateway, a packet data network gateway, and a dispatch station, where:

the video capture terminal sends a bearer setup request to the mobility management entity after negotiating with the dispatch station about a serial number of N streams of video data to be reported, where the bearer setup request carries the serial number of the N streams of video data;

the mobility management entity sets up N evolved packet bearers, each of which is used to transmit one of the N streams of video data, where N is an integer greater than or equal to 1;

the base station configures a monitoring parameter for each stream of video data in the N streams of video data after receiving the N streams of video data broadcasted by the video capture terminal, and sends the monitoring parameter corresponding to each stream of video data in the N streams of video data to the video capture terminal;

the video capture terminal receives the monitoring parameter sent by the base station and corresponding to each stream of video data in the N streams of video data, sends the serial number of the N streams of video data and the monitoring parameter corresponding to the serial number of each stream of video data in the N streams of video data to the trunking terminal, and broadcasts the N streams of video data;

the dispatch station sends the monitoring parameter corresponding to each stream of video data in the N streams of video data to the video capture terminal; and the trunking terminal receives monitoring indication information sent by the dispatch station, where the monitoring indication information carries an identifier of a trunking terminal included in each trunking terminal group that needs to monitor video data specified to be monitored and a serial number of the video data that all trunking terminals in each trunking terminal group specify to monitor; and receives the serial number of the N streams of video data sent by the video capture terminal and the monitoring parameter corresponding to the serial number of each stream of video data in the N streams of video data; confirms, according to an identifier of the trunking terminal itself, a serial number of the video data specified to be monitored that all trunking terminals in a trunking terminal group including the trunking terminal itself need to monitor, among the identifier of the trunking terminal included in each trunking terminal group and the serial number of the video data that all trunking terminals in each trunking terminal group specify to monitor; searches, according to the serial number of the video data specified to be monitored, for a monitoring parameter corresponding to the serial number of the video data specified to be monitored; and uses the found monitoring parameter of the video data specified to be monitored, to monitor the video data specified to be monitored.

Embodiments of the present invention provide a data transmission method, including: receiving N streams of video data uploaded by a video capture terminal; receiving loopback indication information sent by a mobility management entity or the video capture terminal, where the loopback indication information carries an identifier of a bearer of video data to be looped back, where the identifier of the bearer is an identifier of each bearer among N bearers that are set up by the mobility management entity according to a bearer setup request of the video capture terminal and are used for transmitting the N streams of video data, where the bearer setup request carries a serial number of the N streams of video data, the serial number of each stream of video data corresponds to the identifier of the bearer used for transmitting each stream of video data, and the identifier of the bearer of the video data to be looped back is determined by the mobility management entity or the video capture terminal according to a serial number of the video data to be looped back carried in a video loopback request of a dispatch station, where N is an integer greater than or equal to 1; confirming, according to the identifier of the bearer of the video data to be looped back, the video data to be looped back corresponding to the identifier of the bearer of the video data to be looped back; and sending the video data to be looped back to a trunking terminal. In the data transmission method provided by the embodiments of the present invention, data that the trunking terminal needs to monitor is directly looped back at a base station, which, in comparison with the prior art, may reduce a transmission delay and transmit video data obtained by video surveillance to the trunking terminal in real time.

DESCRIPTION OF EMBODIMENTS

Embodiments of the present invention provide a data transmission method, which may reduce a transmission delay and transmit video data obtained by video surveillance to a trunking terminal in real time. Embodiments of the present invention further provide a corresponding device and system. The embodiments are hereinafter described in detail.

Figure 1:
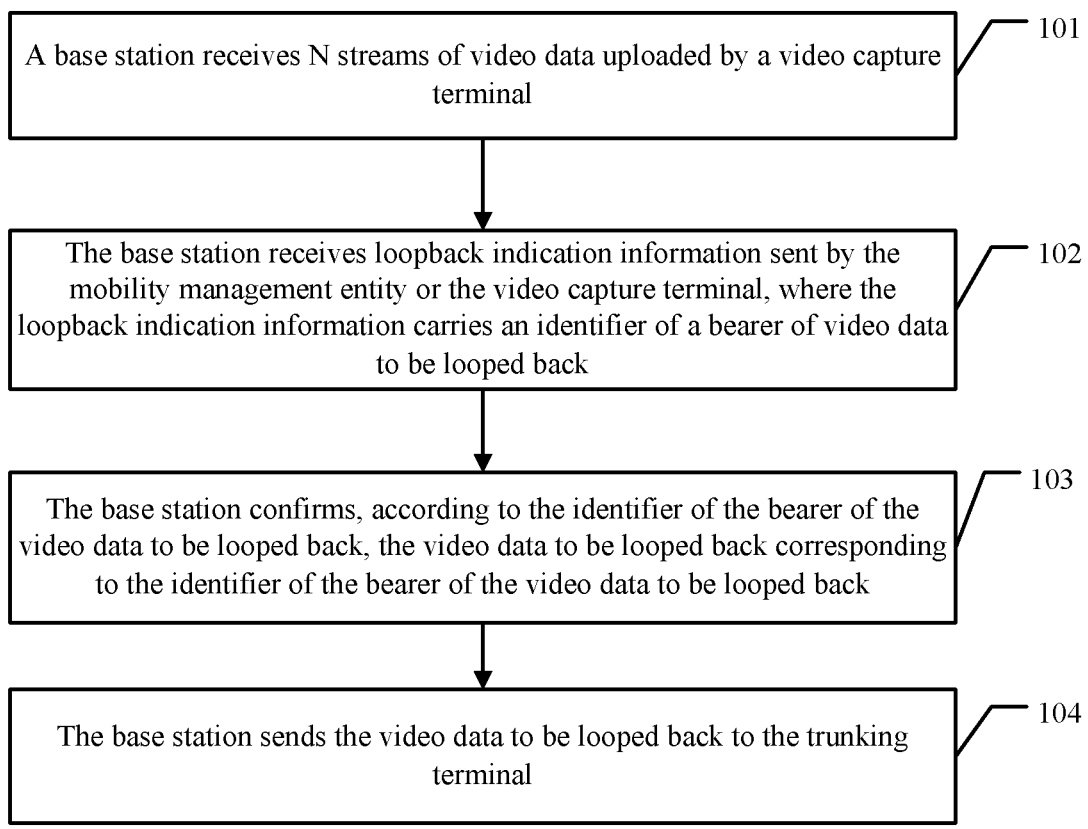
FIG. 1 is a schematic diagram of a data transmission method according to an embodiment of the present invention.

Referring to FIG. 1, from a perspective of a base station, an embodiment of a data transmission method includes the following:

101. A base station receives N streams of video data uploaded by a video capture terminal.

The video capture terminal in this embodiment of the present invention is equivalent to a camera-like apparatus. The data uploaded by the video capture terminal and received by the base station in this embodiment of the present invention may be a stream of data and may also be multiple streams of data.

In the prior art, a video surveillance system based on trunking communications includes a trunking terminal, a video capture terminal, a base station, a mobility management entity (MME), a serving gateway (S-GW), a packet data network gateway (P-GW), and a dispatch station; the MME is responsible for setting up a bearer from the video capture terminal to the P-GW; video data captured by the video capture terminal is transmitted to the dispatch station through the bearer from the video capture terminal to the P-GW; the dispatch station makes a decision according to the received video data, and then transmits data to be looped back to the trunking terminal. In this data transmission process, a transmission delay is increased, and data cannot be transmitted to the trunking terminal in real time.

A data transmission solution provided by this embodiment of the present invention is as follows:

The base station receives the video data uploaded by the video capture terminal, and transmits the received data to the dispatch station through the bearer set up by the mobility management entity from the video capture terminal to the P-GW; after making a decision, the dispatch station instructs the base station to directly loop back a part of the video data to the trunking terminal while this part of the video data is uploaded to the dispatch station at the same time. Therefore, the video data that the trunking terminal needs to monitor is directly looped back at the base station and does not pass over a core network, which does not generate a long transmission delay.

For ease of understanding, an application of the present invention may be described by using a specific instance:

In a hotel with 20 floors, where 10 cameras, namely, video capture terminals mentioned in this embodiment of the present invention, are installed on each floor. Video data captured by each camera is uploaded to a dispatch station by using a network. When a staff at the dispatch station finds that the video data uploaded by a camera on floor 5 shows a fire occurring on floor 5, the dispatch station assigns a security guard on floors 3-7 to extinguish the fire on floor 5, and the dispatch station instructs the base station to directly send the video data of floor 5 subsequently captured to a terminal carried by the security guard on floors 3-7. In this way, the video data received by the security guard on floors 3-7 is obtained from real-time surveillance, and no transmission delay of the core network is caused to the video data, which helps the security guards to control the fire in time.

102. The base station receives loopback indication information sent by the mobility management entity or the video capture terminal, where the loopback indication information carries an identifier of a bearer of video data to be looped back.

The identifier of the bearer is an identifier of each bearer among N bearers that are set up by the mobility management entity according to a bearer setup request of the video capture terminal and are used for transmitting the N streams of video data, where the bearer setup request carries a serial number of the N streams of video data, the serial number of each stream of video data corresponds to the identifier of the bearer used for transmitting each stream of video data, and the identifier of the bearer of the video data to be looped back is determined by the mobility management entity or the video capture terminal according to a serial number of the video data to be looped back carried in a video loopback request of a dispatch station, where N is an integer greater than or equal to 1.

The base station needs to upload the received video data to the dispatch station in real time. The dispatch station determines, according to the received N streams of video data, the data to be looped back, and then sends the data information to be looped back to the base station. The following two solutions may be used to send the data information to be looped back to the base station:

One solution is as follows:

After receiving M video data serial numbers reported by the video capture terminal, the dispatch station instructs the video capture terminal to report video data corresponding to N video data serial numbers specified in the M video data serial numbers, where M is greater than or equal to N, and N is an integer greater than or equal to 1; after receiving the N streams of video data uploaded by the video capture terminal, confirms the video data to be looped back; and sends the video loopback request to the mobility management entity, where the video loopback request carries the serial number of the video data to be looped back.

The mobility management entity confirms, according to the serial number of the video data to be looped back, the identifier of the bearer of the video data to be looped back corresponding to the serial number of the video data to be looped back.

The base station confirms, according to the identifier of the bearer of the video data to be looped back, the video data to be looped back corresponding to the identifier of the bearer of the video data to be looped back, and sends the video data to be looped back to the trunking terminal, where the identifier of the bearer is the identifier of each bearer among N bearers that are set up by the mobility management entity according to the bearer setup request of the video capture terminal and are used for transmitting the N streams of video data, where the bearer setup request carries the serial number of the N streams of video data, and the serial number of each stream of video data corresponds to the identifier of the bearer used for transmitting each stream of video data.

When the loopback indication information sent by the mobility management entity is received, the solution further includes: receiving a bearer modification request sent by the mobility management entity; and modifying a video data transmission bearer and confirming a mapping relationship between an identifier of the modified transmission bearer and an identifier of the transmission bearer before the modification. If the base station modifies the bearer, the base station also determines, according to the mapping relationship between the bearer before the modification and the modified bearer, data corresponding to the identifier of the bearer. No matter how many times the bearer is modified, the mapping relationship between the serial number of the video data and the video data can be determined.

The mapping relationship between the identifier of the bearer and the serial number of the video data is briefly described herein:

The video capture terminal initiates the bearer setup request, where the bearer setup request carries the serial number of the N streams of video data; after receiving the bearer setup request sent by the video capture terminal, the mobility management entity sets up N evolved packet bearers, where each bearer corresponds to one stream of video data, and an identifier of each bearer and an identifier of each stream of video data are correspondingly stored. In this way, after receiving the video loopback request sent by the dispatch station, the mobility management entity may search, according to the serial number of the video data to be looped back, for an identifier of a bearer corresponding to the serial number, thereby completing the process of transmitting the loopback data information from the dispatch station to the base station.

Another solution is as follows:

The dispatch station sends the video loopback request to the video capture terminal; after receiving the video loopback request, the video capture terminal sends the loopback indication information to the base station, where the loopback indication information carries the identifier of the bearer of the video data to be looped back; and the base station confirms, according to the identifier of the bearer of the video data to be looped back, the video data to be looped back corresponding to the identifier of the bearer of the video data to be looped back, and sends the video data to be looped back to the trunking terminal.

103. The base station confirms, according to the identifier of the bearer of the video data to be looped back, the video data to be looped back corresponding to the identifier of the bearer of the video data to be looped back.

No matter whether the base station receives the loopback indication information sent by the mobility management entity or the loopback indication information sent by the video capture terminal, the loopback indication information carries the identifier of the bearer of the video data to be looped back. Therefore, the base station may confirm, according to the identifier of the bearer of the video data to be looped back, the video data to be looped back corresponding to the identifier of the bearer of the video data to be looped back.

104. The base station sends the video data to be looped back to the trunking terminal.

After the video data to be looped back is determined in step 103, the video data to be looped back is sent to the trunking terminal.

The loopback indication information sent by the mobility management entity further carries an identifier of a trunking terminal included in each trunking terminal group that needs to monitor the video data to be looped back and a serial number of the video data to be looped back that all trunking terminals in each trunking terminal group need to monitor.

Before sending the video data to be looped back to the trunking terminal, the method further includes:

allocating a radio network temporary identifier (RNTI) to each stream of video data to be looped back; and sending first monitoring indication information to the trunking terminal or sending a first video loopback response to the video capture terminal;

where the first monitoring indication information carries the radio network temporary identifier, the identifier of the trunking terminal included in each trunking terminal group, and the serial number of the video data to be looped back that all trunking terminals in each trunking terminal group need to monitor, so that the trunking terminal confirms, according to an identifier of the trunking terminal itself, the serial number of the video data to be looped back that all trunking terminals in a trunking terminal group including the trunking terminal itself need to monitor, confirms, according to the serial number of the video data to be looped back and monitored, the video data to be looped back and monitored, and uses the radio network temporary identifier to monitor the video data to be looped back; and the first video loopback response carries the radio network temporary identifier allocated to each stream of video data to be looped back, so that the video capture terminal sends a second video loopback response to the dispatch station, where the second video loopback response carries the serial number of each stream of video data to be looped back and the radio network temporary identifier of each stream of video data to be looped back, so that the dispatch station sends second monitoring indication information to the trunking terminal, where the second monitoring indication information carries the radio network temporary identifier, the identifier of the trunking terminal included in each trunking terminal group, and the serial number of the video data to be looped back that all trunking terminals in each trunking terminal group need to monitor, so that the trunking terminal confirms, according to the identifier of the trunking terminal itself, the serial number of the video data to be looped back that all trunking terminals in the trunking terminal group including the trunking terminal itself need to monitor, confirms, according to the serial number of the video data to be looped back and monitored, the video data to be looped back and monitored, and uses the radio network temporary identifier to monitor the video data to be looped back.

An example of a process in which a trunking terminal monitors video data to be looped back is as follows:

There are 10 trunking terminals in total: 0, 1, 2, . . . , 9, where 0, 1, 2, and 3 are arranged into a group, and the others are arranged into a group. In this case, information about the first group is: a group identifier, for example, Group1; group members: 0, 1, 2, and 3; serial numbers of video data to be monitored in this group, for example, serial numbers 3A and 3C of two cameras in area A on floor 3 and area C on floor 3; and each RNTI corresponds to a serial number of a stream of video data, for example, RNTI_1 corresponds to 3A and RNTI_2 corresponds to 3C.

Assuming that a trunking terminal whose identifier is 1 detects that the group including the trunking terminal itself is Group1, the trunking terminal may know that it needs to use RNTI_1 to monitor video data numbered 3A and use RNTI_2 to monitor video data numbered 3C.

Therefore, the base station only needs to send the video data to the trunking terminal group once. Each trunking terminal in this trunking terminal group confirms, according to an identifier of the trunking terminal itself, the serial number of the video data to be looped back that all trunking terminals in the trunking terminal group including the trunking terminal itself need to monitor, confirms, according to the serial number of the video data to be looped back and monitored, the video data to be looped back and monitored, and uses the radio network temporary identifier to monitor the video data to be looped back.

In this embodiment of the present invention, a base station receives N streams of video data uploaded by a video capture terminal; receives loopback indication information sent by a mobility management entity or the video capture terminal, where the loopback indication information carries an identifier of a bearer of video data to be looped back, where the identifier of the bearer is an identifier of each bearer among N bearers that are set up by the mobility management entity according to a bearer setup request of the video capture terminal and are used for transmitting the N streams of video data, where the bearer setup request carries a serial number of the N streams of video data, the serial number of each stream of video data corresponds to the identifier of the bearer used for transmitting each stream of video data, and the identifier of the bearer of the video data to be looped back is determined by the mobility management entity or the video capture terminal according to a serial number of the video data to be looped back carried in a video loopback request of a dispatch station, where N is an integer greater than or equal to 1; confirms, according to the identifier of the bearer of the video data to be looped back, the video data to be looped back corresponding to the identifier of the bearer of the video data to be looped back; and sends the video data to be looped back to a trunking terminal. In the data transmission method provided by this embodiment of the present invention, data that the trunking terminal needs to monitor is directly looped back at the base station, which, in comparison with the prior art, may reduce a transmission delay and transmit video data obtained by video surveillance to the trunking terminal in real time.

Figure 2:
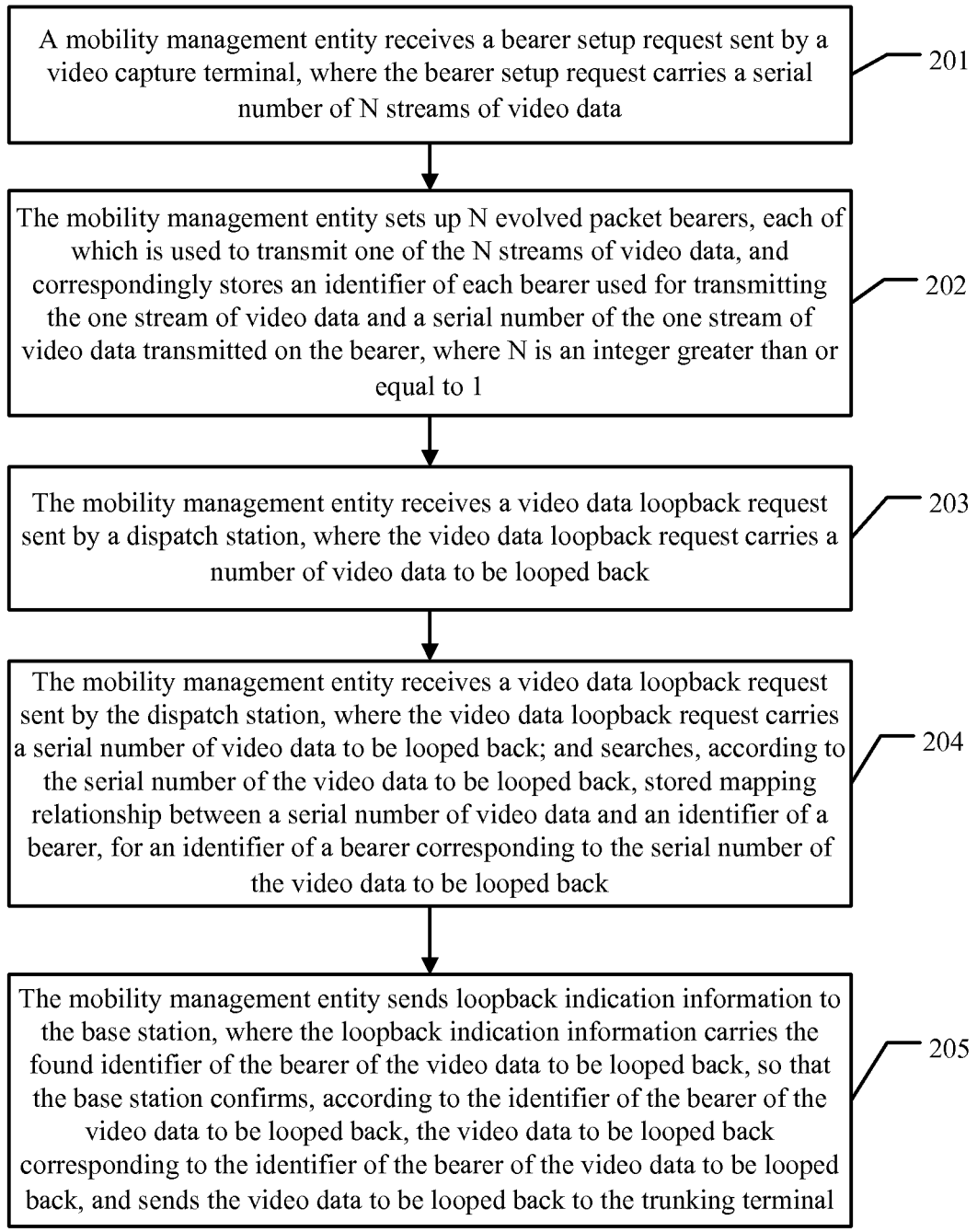
FIG. 2 is a schematic diagram of a data transmission method according to an embodiment of the present invention.

Referring to FIG. 2, from a perspective of a mobility management entity, another embodiment of a data transmission method includes the following:

201. A mobility management entity receives a bearer setup request sent by a video capture terminal, where the bearer setup request carries a serial number of N streams of video data.

In this embodiment of the present invention, from the perspective of the mobility management entity, the mobility management entity is responsible for setting up a bearer from the video capture terminal to a P-GW to implement data transmission. Different from the prior art, the bearer setup request carries a serial number of N streams of video data.

202. The mobility management entity sets up N evolved packet bearers, each of which is used to transmit one of the N streams of video data, and correspondingly stores an identifier of each bearer used for transmitting the one stream of video data and a serial number of the one stream of video data transmitted on the bearer, where N is an integer greater than or equal to 1.

After receiving a request for setting up a bearer for a specific quantity of streams of data, the mobility management entity sets up a bearer for the specific quantity of the streams of data, where each bearer corresponds to one stream of video data, and an identifier of each bearer and a serial number of each stream of video data are stored correspondingly.

203. The mobility management entity receives a video loopback request sent by a dispatch station, where the video loopback request carries a number of video data to be looped back.

The dispatch station sends data information to be looped back to a base station. The transmission of the data information to be looped back may be completed by using the mobility management entity, which may be specifically understood by means of steps 203-205.

The dispatch station sends a video loopback request to the mobility management entity, and the mobility management entity receives the video loopback request sent by the dispatch station, where the video loopback request carries the serial number of video data to be looped back.

The video loopback request further carries an identifier of a trunking terminal included in each trunking terminal group that needs to monitor the video data to be looped back and a serial number of the video data to be looped back that all trunking terminals in each trunking terminal group need to monitor.

204. The mobility management entity searches, according to the serial number of the video data to be looped back, stored mapping relationship between a serial number of video data and an identifier of a bearer, for an identifier of a bearer corresponding to the serial number of the video data to be looped back.

When a bearer is set up in step 202, the mapping relationship between the serial number of video data and the identifier of the bearer is stored. Therefore, the identifier of the bearer corresponding to the serial number of the video data to be looped back can be found according to the serial number of the video data to be looped back.

205. The mobility management entity sends loopback indication information to the base station, where the loopback indication information carries the found identifier of the bearer of the video data to be looped back, so that the base station confirms, according to the identifier of the bearer of the video data to be looped back, the video data to be looped back corresponding to the identifier of the bearer of the video data to be looped back, and sends the video data to be looped back to the trunking terminal.

The loopback indication information further carries the identifier of the trunking terminal included in each trunking terminal group that needs to monitor the video data to be looped back and the serial number of the video data to be looped back that all trunking terminals in each trunking terminal group need to monitor.

When the loopback indication information is sent to the base station, a bearer modification request is also sent to the base station, so that the base station modifies a video data transmission bearer, and confirms a mapping relationship between an identifier of the modified transmission bearer and an identifier of the transmission bearer before the modification.

In this embodiment of the present invention, a mobility management entity receives a bearer setup request sent by a video capture terminal, where the bearer setup request carries a serial number of N streams of video data; sets up N evolved packet bearers, each of which is used to transmit one of the N streams of video data, and correspondingly stores an identifier of each bearer used for transmitting the one stream of video data and a serial number of the one stream of video data transmitted on the bearer, where N is an integer greater than or equal to 1; receives a video loopback request sent by a dispatch station, where the video loopback request carries a serial number of video data to be looped back; searches, according to the serial number of the video data to be looped back, the stored mapping relationship between a serial number of video data and an identifier of a bearer, for an identifier of a bearer corresponding to the serial number of the video data to be looped back; and sends loopback indication information to a base station, where the loopback indication information carries the found identifier of the bearer of the video data to be looped back, so that the base station confirms, according to the identifier of the bearer of the video data to be looped back, the video data to be looped back corresponding to the identifier of the bearer of the video data to be looped back, and sends the video data to be looped back to a trunking terminal. In the data transmission method provided by this embodiment of the present invention, data required by the trunking terminal is directly looped back at the base station, which, in comparison with the prior art, may reduce a transmission delay and transmit video data obtained by video surveillance to the trunking terminal in real time.

Figure 3:
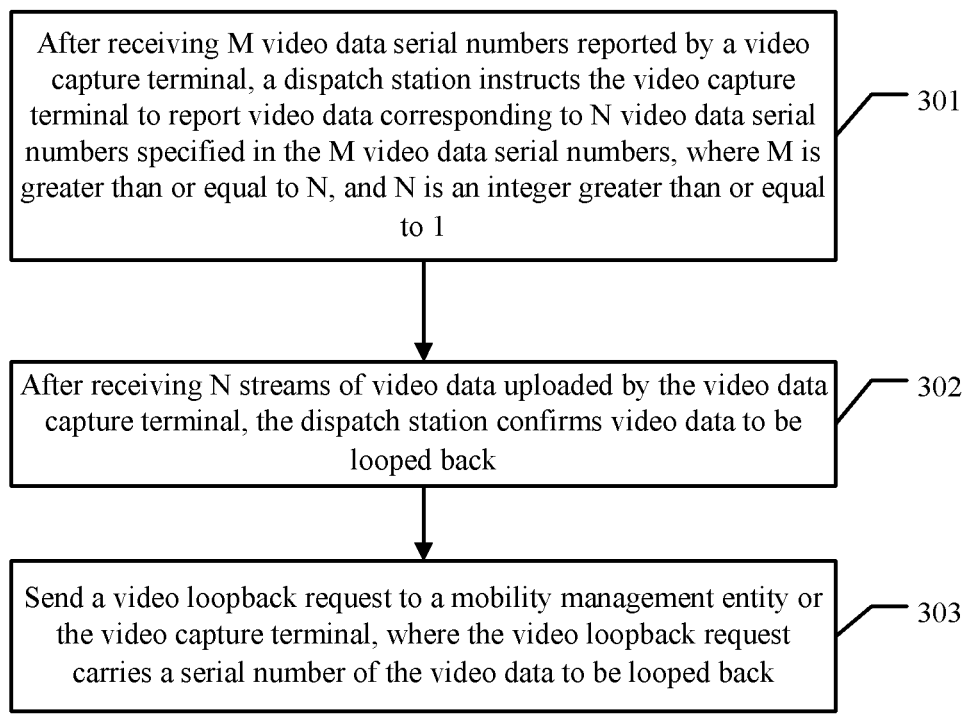
FIG. 3 is a schematic diagram of a data transmission method according to an embodiment of the present invention.

Referring to FIG. 3, from a perspective of a dispatch station, another embodiment of a data transmission method includes the following:

301. After receiving M video data serial numbers reported by a video capture terminal, a dispatch station instructs the video capture terminal to report video data corresponding to N video data serial numbers specified in the M video data serial numbers, where M is greater than or equal to N, and N is an integer greater than or equal to 1.

The video capture terminal first needs to negotiate with the dispatch station about which video data serial number is to be reported, a resolution of reported video data, a compression coding mode, a bit rate, and the like. After the video capture terminal reports the M video data serial numbers, if the dispatch station decides that the video data corresponding to the N video data serial numbers among the M video data serial numbers will be reported, the dispatch station delivers the N video data serial numbers, and specifies the resolution, compression coding mode, bit rate, and the like that will be used when the video data is reported.

302. After receiving N streams of video data uploaded by the video capture terminal, the dispatch station confirms video data to be looped back.

After the video capture terminal receives a reporting indication sent by the dispatch station, the video capture terminal reports, by using the resolution, compression coding mode, and bit rate specified by the dispatch station, the N streams of video data specified by the dispatch station. After receiving the N streams of video data uploaded by the video capture terminal, the dispatch station confirms, according to the information in the video data, video data to be looped back.

The dispatch station is equivalent to a head station and similar to a command headquarters. For example, in the instance of step 101, a dispatch station in a hotel having 20 floors may receive video data monitored by each camera in the hotel, and when a fire or another emergency occurs, may command a staff nearby to take an action.

303. Send a video loopback request to a mobility management entity or the video capture terminal, where the video loopback request carries a serial number of the video data to be looped back.

The mobility management entity or video capture terminal confirms, according to the serial number of the video data to be looped back, an identifier of a bearer of the video data to be looped back corresponding to the serial number of the video data to be looped back.

The base station confirms, according to the identifier of the bearer of the video data to be looped back, the video data to be looped back corresponding to the identifier of the bearer of the video data to be looped back, and sends the video data to be looped back to a trunking terminal, where the identifier of the bearer is an identifier of each bearer among N bearers that are set up by the mobility management entity according to a bearer setup request of the video capture terminal and are used for transmitting the N streams of video data, where the bearer setup request carries a serial number of the N streams of video data, and the serial number of each stream of video data corresponds to the identifier of the bearer used for transmitting each stream of video data.

In this embodiment of the present invention, after receiving M video data serial numbers reported by a video capture terminal, a dispatch station instructs the video capture terminal to report video data corresponding to N video data serial numbers specified in the M video data serial numbers, where M is greater than or equal to N, and N is an integer greater than or equal to 1; after receiving N streams of video data uploaded by the video capture terminal, confirms video data to be looped back; and sends a video loopback request to a mobility management entity or the video capture terminal, where the video loopback request carries a serial number of the video data to be looped back, so that the mobility management entity or the video capture terminal confirms, according to the serial number of the video data to be looped back, an identifier of a bearer of the video data to be looped back corresponding to the serial number of the video data to be looped back, so that a base station confirms, according to the identifier of the bearer of the video data to be looped back, the video data to be looped back corresponding to the identifier of the bearer of the video data to be looped back, and sends the video data to be looped back to a trunking terminal, where the identifier of the bearer is an identifier of each bearer among N bearers that are set up by the mobility management entity according to a bearer setup request of the video capture terminal and are used for transmitting the N streams of video data, where the bearer setup request carries a serial number of the N streams of video data, and the serial number of each stream of video data corresponds to the identifier of the bearer used for transmitting each stream of video data. In the data transmission method provided by this embodiment of the present invention, data required by the trunking terminal is directly looped back at the base station, which, in comparison with the prior art, may reduce a transmission delay and transmit video data obtained by video surveillance to the trunking terminal in real time.

Optionally, in this embodiment of the present invention, after sending a video loopback request to the video capture terminal, the method further includes: receiving a video loopback response sent by the video capture terminal, where the video loopback response carries the serial number of the video data to be looped back and a radio network temporary identifier corresponding to the serial number; and sending second monitoring indication information to the trunking terminal, where the second monitoring indication information carries the radio network temporary identifier, an identifier of a trunking terminal included in each trunking terminal group, and a serial number of the video data to be looped back that all trunking terminals in each trunking terminal group need to monitor, so that the trunking terminal confirms, according to an identifier of the trunking terminal itself, the serial number of the video data to be looped back that all trunking terminals in a trunking terminal group including the trunking terminal itself need to monitor, confirms, according to the serial number of the video data to be looped back and monitored, the video data to be looped back and monitored, and uses the radio network temporary identifier to monitor the video data to be looped back.

Figure 4:
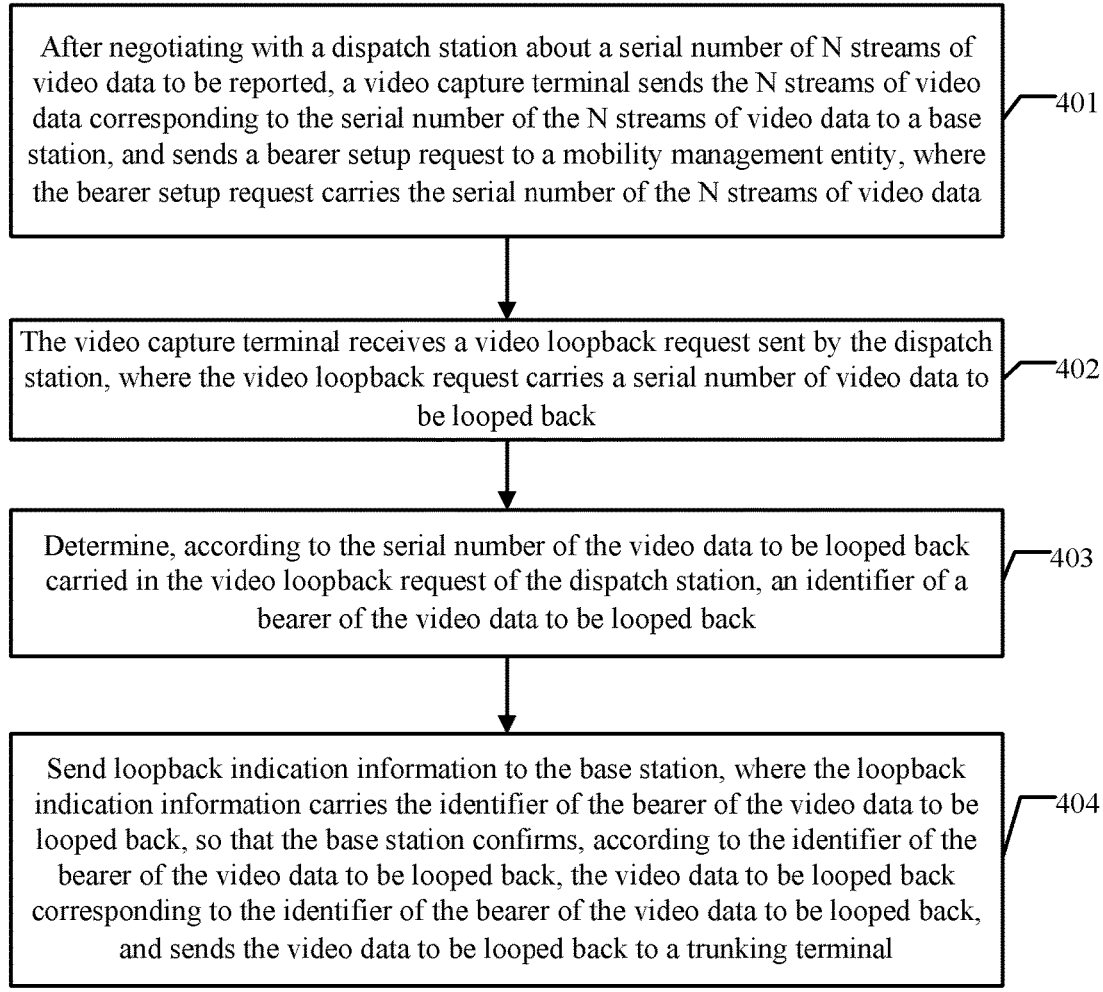
FIG. 4 is a schematic diagram of a data transmission method according to an embodiment of the present invention.

Referring to FIG. 4, from a perspective of a video capture terminal, another embodiment of a data transmission method includes the following:

401. After negotiating with a dispatch station about a serial number of N streams of video data to be reported, a video capture terminal sends the N streams of video data corresponding to the serial number of the N streams of video data to a base station, and sends a bearer setup request to a mobility management entity, where the bearer setup request carries the serial number of the N streams of video data.

According to the foregoing step 301, after negotiating with the dispatch station about the serial number of the N streams of video data to be reported, the video capture terminal sends the N streams of video data corresponding to the serial number of the N streams of video data to the base station, and sends the bearer setup request to the mobility management entity, where the bearer setup request carries the serial number of the N streams of video data, so that the mobility management entity sets up the N evolved packet bearers, each of which is used to transmit one of the N streams of video data, and correspondingly stores the identifier of each bearer used for transmitting the one stream of video data and the number of the one stream of video data transmitted on the bearer.

402. The video capture terminal receives a video loopback request sent by the dispatch station, where the video loopback request carries a serial number of video data to be looped back.

403. Determine, according to the serial number of the video data to be looped back carried in the video loopback request of the dispatch station, an identifier of a bearer of the video data to be looped back.

404. Send loopback indication information to the base station, where the loopback indication information carries the identifier of the bearer of the video data to be looped back, so that the base station confirms, according to the identifier of the bearer of the video data to be looped back, the video data to be looped back corresponding to the identifier of the bearer of the video data to be looped back, and sends the video data to be looped back to a trunking terminal.

The method provided by this embodiment of the present invention further includes:

receiving a first video loopback response sent by the base station, where the first video loopback response carries a radio network temporary identifier allocated to each stream of video data to be looped back; and sending a second video loopback response to the dispatch station, where the second video loopback response carries the serial number of each stream of video data to be looped back and the radio network temporary identifier of each stream of video data to be looped back, so that the dispatch station sends second monitoring indication information to the trunking terminal, where the second monitoring indication information carries the radio network temporary identifier, an identifier of a trunking terminal included in each trunking terminal group, and a serial number of video data to be looped back that all trunking terminals in each trunking terminal group need to monitor, so that the trunking terminal confirms, according to an identifier of the trunking terminal itself, a serial number of the video data to be looped back that all trunking terminals in a trunking terminal group including the trunking terminal itself need to monitor, confirms, according to the serial number of the video data to be looped back and monitored, the video data to be looped back and monitored, and uses the radio network temporary identifier to monitor the video data to be looped back.

In this embodiment of the present invention, after negotiating with a dispatch station about a serial number of N streams of video data to be reported, a video capture terminal sends the N streams of video data corresponding to the serial number of the N streams of video data to a base station, and sends a bearer setup request to a mobility management entity, where the bearer setup request carries the serial number of the N streams of video data, so that the mobility management entity sets up N evolved packet bearers, each of which is used to transmit one of the N streams of video data, and correspondingly stores an identifier of each bearer used for transmitting the one stream of video data and a serial number of the one stream of video data transmitted on the bearer; receives a video loopback request sent by the dispatch station, where the video loopback request carries a serial number of video data to be looped back; determines, according to the serial number of the video data to be looped back carried in the video loopback request of the dispatch station, an identifier of a bearer of the video data to be looped back; and sends loopback indication information to the base station, where the loopback indication information carries the identifier of the bearer of the video data to be looped back, so that the base station confirms, according to the identifier of the bearer of the video data to be looped back, the video data to be looped back corresponding to the identifier of the bearer of the video data to be looped back, and sends the video data to be looped back to a trunking terminal. In the data transmission method provided by this embodiment of the present invention, data required by the trunking terminal is directly looped back at the base station, which, in comparison with the prior art, may reduce a transmission delay and transmit video data obtained by video surveillance to the trunking terminal in real time.

The foregoing 4 embodiments mainly describe how to use a data loopback solution at a base station to solve the problem of a long transmission delay in the prior art. In the following embodiments corresponding to FIGS. 5-8, data is directly broadcasted by video capture terminal, both a trunking terminal and a base station can monitor data broadcasted by a video capture terminal, and the base station may report monitored video data to a dispatch station, so that the transmission delay in the prior art will not occur. The trunking terminal may only monitor, according to an indication of the dispatch station, data that the dispatch station specifies to monitor.

Figure 5:
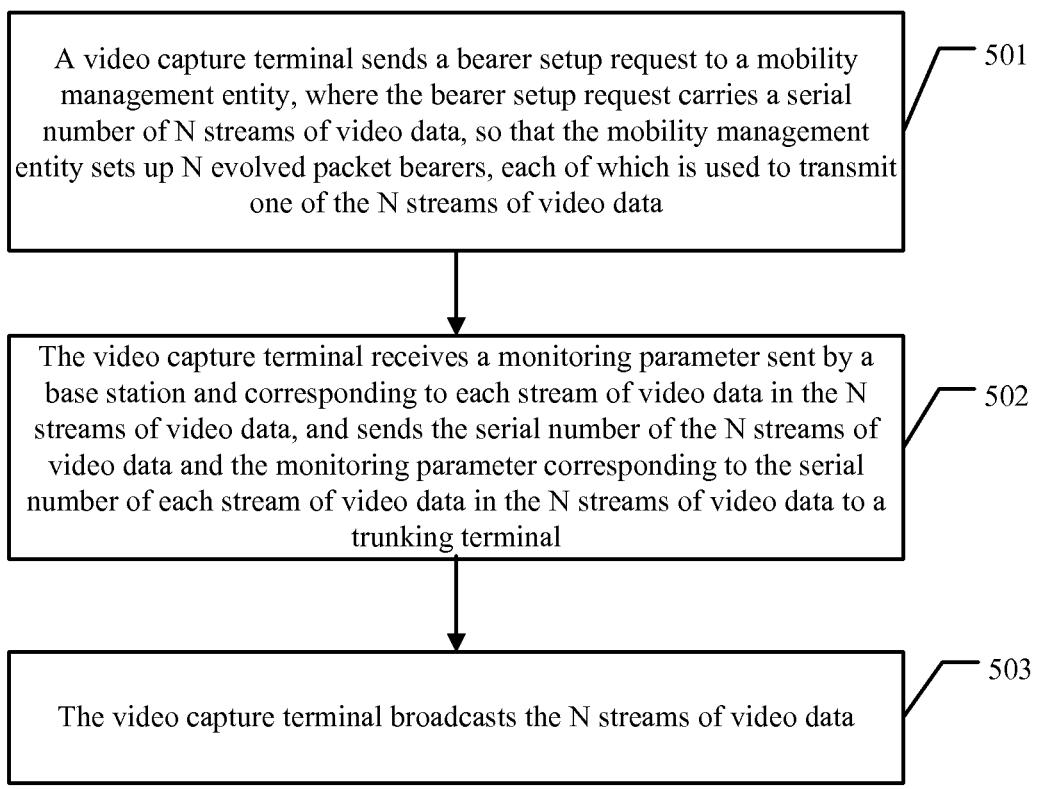
FIG. 5 is a schematic diagram of a data transmission method according to an embodiment of the present invention.

Referring to FIG. 5, from a perspective of a video capture terminal, another embodiment of a data transmission method in the present invention includes the following:

501. A video capture terminal sends a bearer setup request to a mobility management entity, where the bearer setup request carries a serial number of N streams of video data, so that the mobility management entity sets up N evolved packet bearers, each of which is used to transmit one of the N streams of video data.

502. The video capture terminal receives a monitoring parameter sent by a base station and corresponding to each stream of video data in the N streams of video data, and sends the serial number of the N streams of video data and the monitoring parameter corresponding to the serial number of each stream of video data in the N streams of video data to a trunking terminal.

To monitor video data, the trunking terminal needs to know a location of the video data. The monitoring parameter is actually configured by the base station for the video capture terminal, and includes a location of a resource, transmit power, a modulation and coding scheme, and the like, that is, content in a resource semi-static adjustment policy frequently said in the industry. Each stream of video data corresponds to a monitoring parameter.

503. The video capture terminal broadcasts the N streams of video data.

The video capture terminal broadcasts the N streams of video data, so that a dispatch station sends monitoring indication information to the trunking terminal according to the N streams of video data, where the monitoring indication information carries a serial number of video data specified to be monitored in the N streams of video data, so that the trunking terminal searches, according to the serial number of the video data specified to be monitored, for a monitoring parameter corresponding to the serial number of the video data specified to be monitored, and uses the found monitoring parameter of the video data specified to be monitored, to monitor the video data specified to be monitored.

In this embodiment of the present invention, a bearer setup request is sent to a mobility management entity, where the bearer setup request carries a serial number of N streams of video data, so that the mobility management entity sets up N evolved packet bearers, each of which is used to transmit one of the N streams of video data; a monitoring parameter sent by a base station and corresponding to each stream of video data in the N streams of video data is received, and the serial number of the N streams of video data and the monitoring parameter corresponding to the serial number of each stream of video data in the N streams of video data are sent to a trunking terminal; and the N streams of video data are broadcasted, so that a dispatch station sends monitoring indication information to the trunking terminal according to the N streams of video data, where the monitoring indication information carries a serial number of video data specified to be monitored in the N streams of video data, so that the trunking terminal searches, according to the serial number of the video data specified to be monitored, for a monitoring parameter corresponding to the serial number of the video data specified to be monitored, and uses the found monitoring parameter of the video data specified to be monitored, to monitor the video data specified to be monitored. In the data transmission method provided by this embodiment of the present invention, the video capture terminal broadcasts video data, and the trunking terminal only monitors, according to the indication of the dispatch station, data that the dispatch station specifies to monitor. This, in comparison with the prior art, neither causes a transmission delay, nor requires a piece of data to be sent twice in uplink and downlink directions, thereby effectively improving spectrum utilization.

Optionally, after the base station adjusts the monitoring parameter of each stream of video data, the method further includes: receiving an adjusted monitoring parameter sent by the base station and corresponding to the N streams of video data; and sending the serial number of the N streams of video data and the adjusted monitoring parameter corresponding to the serial number of the N streams of video data to the trunking terminal, so that the trunking terminal searches, according to the serial number of the video data specified to be monitored, for an adjusted monitoring parameter corresponding to the serial number of the video data specified to be monitored, and uses the found adjusted monitoring parameter to monitor the video data specified to be monitored.

Figure 6:
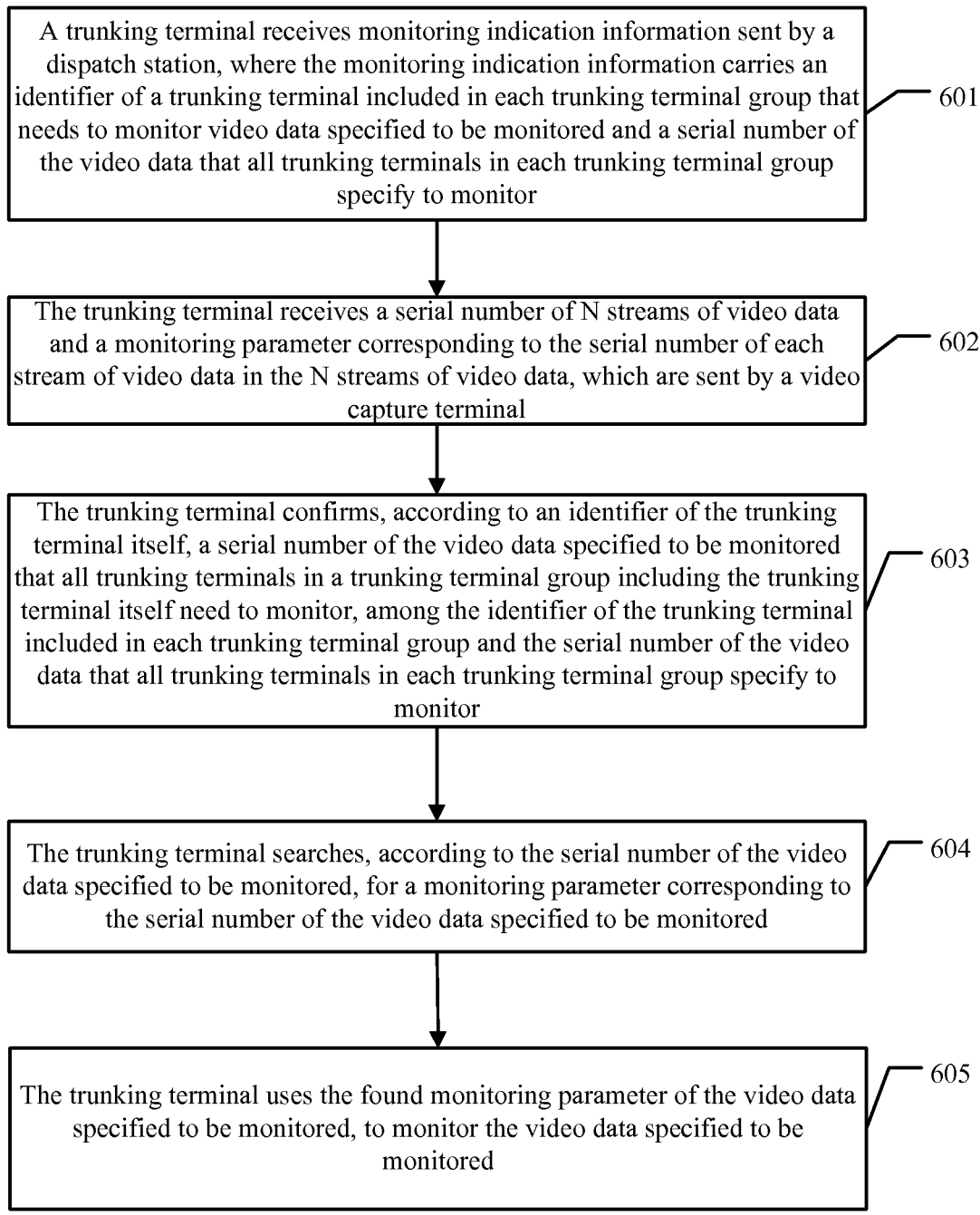
FIG. 6 is a schematic diagram of a data transmission method according to an embodiment of the present invention.

Referring to FIG. 6, from a perspective of a trunking terminal, another embodiment of a data transmission method includes the following:

601. A trunking terminal receives monitoring indication information sent by a dispatch station, where the monitoring indication information carries an identifier of a trunking terminal included in each trunking terminal group that needs to monitor video data specified to be monitored and a serial number of the video data that all trunking terminals in each trunking terminal group specify to monitor.

602. The trunking terminal receives a serial number of N streams of video data and a monitoring parameter corresponding to the serial number of each stream of video data in the N streams of video data, which are sent by a video capture terminal.

603. The trunking terminal confirms, according to an identifier of the trunking terminal itself, a serial number of the video data specified to be monitored that all trunking terminals in a trunking terminal group including the trunking terminal itself need to monitor, among the identifier of the trunking terminal included in each trunking terminal group and the serial number of the video data that all trunking terminals in each trunking terminal group specify to monitor.

604. The trunking terminal searches, according to the serial number of the video data specified to be monitored, for a monitoring parameter corresponding to the serial number of the video data specified to be monitored.

605. The trunking terminal uses the found monitoring parameter of the video data specified to be monitored, to monitor the video data specified to be monitored.

In this embodiment of the present invention, when the trunking terminal monitors the video data specified to be monitored, the method further includes: monitoring channel quality of the video capture terminal; and sending the channel quality to a base station, so that the base station reconfigures, according to the channel quality, a monitoring parameter corresponding to the serial number of the N streams of video data.

In this embodiment of the present invention, monitoring indication information sent by a dispatch station is received, where the monitoring indication information carries an identifier of a trunking terminal included in each trunking terminal group that needs to monitor video data specified to be monitored and a serial number of the video data that all trunking terminals in each trunking terminal group specify to monitor; a serial number of N streams of video data and a monitoring parameter corresponding to the serial number of each stream of video data in the N streams of video data sent by a video capture terminal are received; according to an identifier of a trunking terminal itself, a serial number of the video data specified to be monitored that all trunking terminals in a trunking terminal group including the trunking terminal itself need to monitor is confirmed among the identifier of the trunking terminal included in each trunking terminal group and the serial number of the video data that all trunking terminals in each trunking terminal group specify to monitor; according to the serial number of the video data specified to be monitored, a monitoring parameter corresponding to the serial number of the video data specified to be monitored is searched for; and the found monitoring parameter of the video data specified to be monitored is used to monitor the video data specified to be monitored. In the data transmission method provided by this embodiment of the present invention, the video capture terminal broadcasts video data, and the trunking terminal only monitors, according to the indication of the dispatch station, data that the dispatch station specifies to monitor. This, in comparison with the prior art, neither causes a transmission delay, nor requires a piece of data to be sent twice in uplink and downlink directions, thereby effectively improving spectrum utilization.

Figure 7:
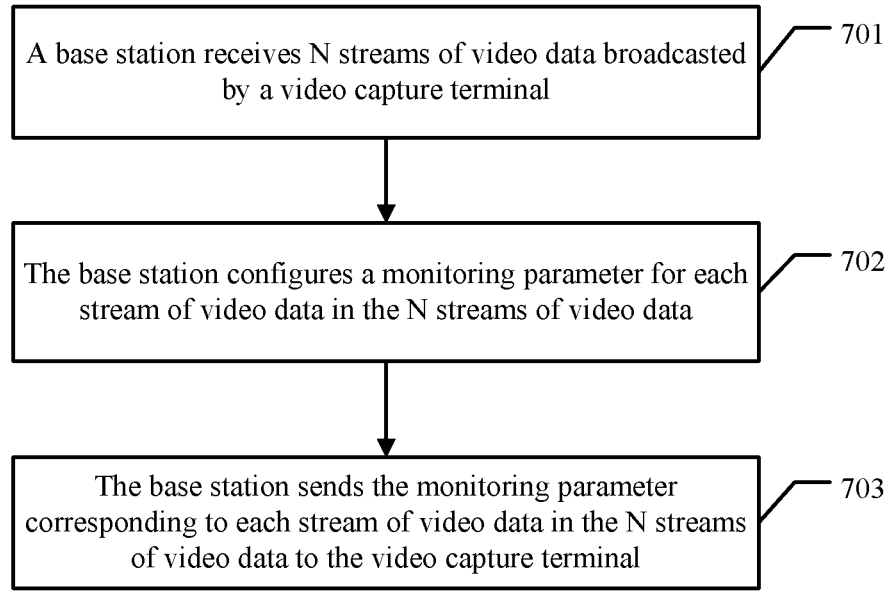
FIG. 7 is a schematic diagram of a data transmission method according to an embodiment of the present invention.

Referring to FIG. 7, from a perspective of a base station, another embodiment of a data transmission method includes the following:

701. A base station receives N streams of video data broadcasted by a video capture terminal.

The base station may monitor video data broadcasted by the video capture terminal, and then upload the monitored video data to a dispatch station.

702. The base station configures a monitoring parameter for each stream of video data in the N streams of video data.

The monitoring parameter configured by the base station for the video capture terminal includes a location of a resource, transmit power, a modulation and coding scheme, and the like, that is, content in a resource semi-static adjustment policy frequently said in the industry. Each stream of video data corresponds to a monitoring parameter.

703. The base station sends the monitoring parameter corresponding to each stream of video data in the N streams of video data to the video capture terminal.

The base station sends the monitoring parameter corresponding to each stream of video data in the N streams of video data to the video capture terminal, so that the video capture terminal sends a serial number of the N streams of video data and the monitoring parameter corresponding to the serial number of each stream of video data in the N streams of video data to a trunking terminal, so that the trunking terminal searches, according to a serial number of video data specified to be monitored, for a monitoring parameter corresponding to the serial number of the video data specified to be monitored, and uses the found monitoring parameter of the video data specified to be monitored, to monitor the video data specified to be monitored.

In this embodiment of the present invention, N streams of video data broadcasted by a video capture terminal are received; a monitoring parameter is configured for each stream of video data in the N streams of video data; and the monitoring parameter corresponding to each stream of video data in the N streams of video data is sent to the video capture terminal, so that the video capture terminal sends a serial number of the N streams of video data and the monitoring parameter corresponding to the serial number of each stream of video data in the N streams of video data to a trunking terminal, so that the trunking terminal searches, according to a serial number of video data specified to be monitored, for a monitoring parameter corresponding to the serial number of the video data specified to be monitored, and uses the found monitoring parameter of the video data specified to be monitored, to monitor the video data specified to be monitored. In the data transmission method provided by this embodiment of the present invention, the video capture terminal broadcasts video data, and the trunking terminal only monitors, according to the indication of the dispatch station, data that the dispatch station specifies to monitor. This, in comparison with the prior art, neither causes a transmission delay, nor requires a piece of data to be sent twice in uplink and downlink directions, thereby effectively improving spectrum utilization.

Optionally, the method provided by this embodiment of the present invention further includes: receiving channel quality of the video capture terminal sent by the trunking terminal; and adjusting, according to the channel quality of the video capture terminal, a monitoring parameter corresponding to the serial number of the N streams of video data, and sending the adjusted monitoring parameter corresponding to the serial number of the N streams of video data to the video capture terminal, so that the video capture terminal sends the serial number of the N streams of video data and an adjusted monitoring parameter corresponding to the serial number of each stream of video data in the N streams of video data to the trunking terminal, so that the trunking terminal searches, according to the serial number of the video data specified to be monitored, for an adjusted monitoring parameter corresponding to the serial number of the video data specified to be monitored, and uses the found adjusted monitoring parameter of the video data specified to be monitored, to monitor the video data specified to be monitored.

Figure 8:
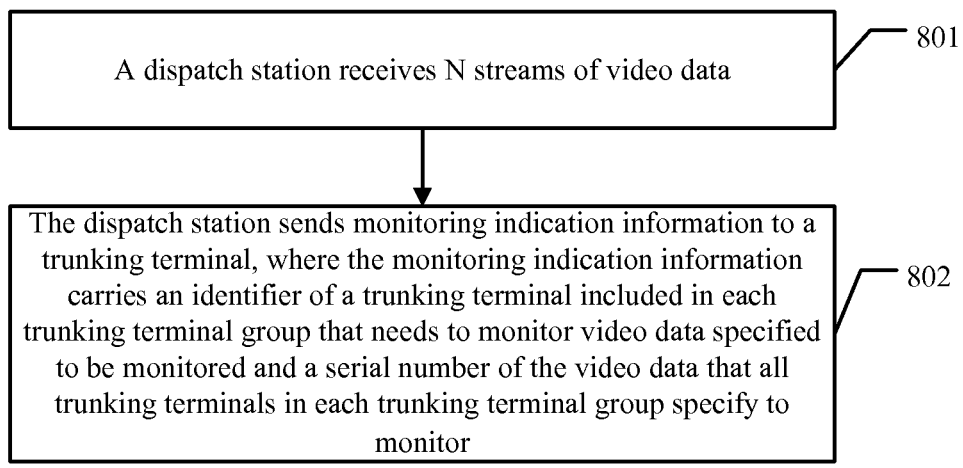
FIG. 8 is a schematic diagram of a data transmission method according to an embodiment of the present invention.

Referring to FIG. 8, from a perspective of a dispatch station, another embodiment of a data transmission method includes the following:

801. A dispatch station receives N streams of video data.

The dispatch station receives the N streams of video data reported by a video capture terminal.

802. The dispatch station sends monitoring indication information to a trunking terminal, where the monitoring indication information carries an identifier of a trunking terminal included in each trunking terminal group that needs to monitor video data specified to be monitored and a serial number of the video data that all trunking terminals in each trunking terminal group specify to monitor.

The dispatch station sends the monitoring indication information to the trunking terminal, so that the trunking terminal confirms, according to an identifier of the trunking terminal itself, a serial number of the video data specified to be monitored that all trunking terminals in a trunking terminal group including the trunking terminal itself need to monitor, searches, according to the serial number of the video data specified to be monitored, for a monitoring parameter corresponding to the serial number of the video data specified to be monitored, and uses the found monitoring parameter of the video data specified to be monitored, to monitor the video data specified to be monitored.

The monitoring parameter is a monitoring parameter that is sent, along with a serial number of the N streams of video data, to the trunking terminal by a video capture terminal, where the serial number of the N streams of video data and the monitoring parameter are sent by a base station to the video capture terminal after the base station receives the N streams of video data broadcasted by the video capture terminal; and the monitoring parameter corresponds to a serial number of each stream of video data among the N streams of video data.

In this embodiment of the present invention, after N streams of video data are received, monitoring indication information is sent to a trunking terminal, where the monitoring indication information carries an identifier of a trunking terminal included in each trunking terminal group that needs to monitor video data specified to be monitored and a serial number of the video data that all trunking terminals in each trunking terminal group specify to monitor, so that the trunking terminal confirms, according to an identifier of the trunking terminal itself, a serial number of the video data specified to be monitored that all trunking terminals in a trunking terminal group including the trunking terminal itself need to monitor, searches, according to the serial number of the video data specified to be monitored, for a monitoring parameter corresponding to the serial number of the video data specified to be monitored, and uses the found monitoring parameter of the video data specified to be monitored, to monitor the video data specified to be monitored; where the monitoring parameter is a monitoring parameter that is sent, along with a serial number of the N streams of video data, to the trunking terminal by a video capture terminal, where the serial number of the N streams of video data and the monitoring parameter are sent by a base station to the video capture terminal after the base station receives the N streams of video data broadcasted by the video capture terminal; and the monitoring parameter corresponds to a serial number of each stream of video data among the N streams of video data. In the data transmission method provided by this embodiment of the present invention, the video capture terminal broadcasts video data, and the trunking terminal only monitors, according to the indication of the dispatch station, data that the dispatch station specifies to monitor. This, in comparison with the prior art, neither causes a transmission delay, nor requires a piece of data to be sent twice in uplink and downlink directions, thereby effectively improving spectrum utilization.

Figure 9:
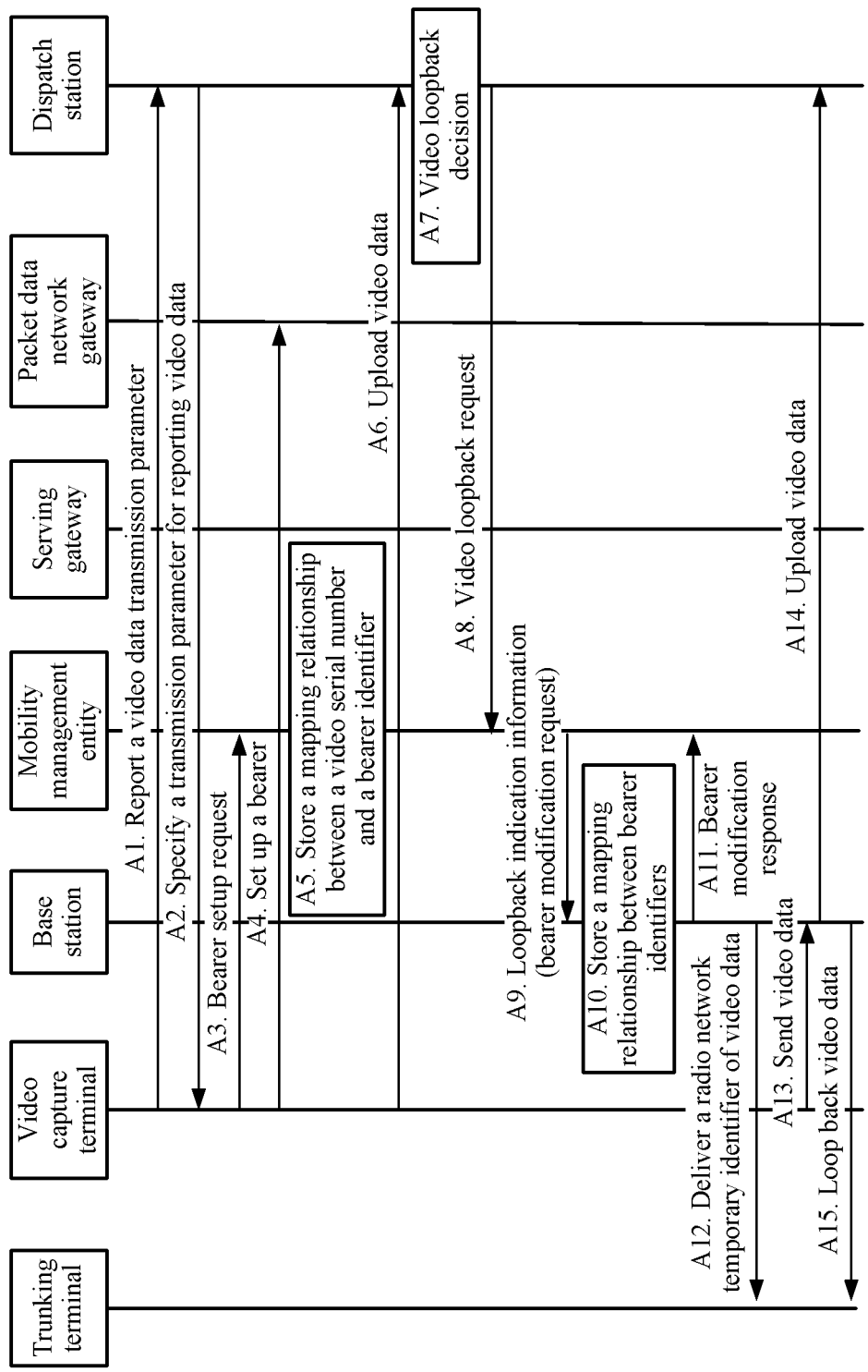
FIG. 9 is a schematic diagram of a data transmission method according to an embodiment of the present invention.

For ease of understanding, the following describes a specific process of the foregoing data transmission on the whole:

Referring to FIG. 9, another embodiment of a data transmission method includes the following:

A1. A video capture terminal reports a video data transmission parameter to a dispatch station.

The data transmission parameter includes a resolution, a compression coding mode, a bit rate, and a serial number of video data.

A2. The dispatch station specifies a parameter for reporting video data.

After receiving a video data transmission parameter reported by multiple video capture terminals, the dispatch station specifies that the video capture terminals report video data by using the specified resolution and transmission bit rate. For example, after the dispatch station receives, from video capture terminals, a parameter of 20 streams of video data to be reported, where video data is numbered 1-20, the dispatch station may specify 4-6 streams of video data among the 20 streams of video data to be reported.

A3. The video capture terminal sends a bearer setup request to a mobility management entity.

A4. The mobility management entity sets up a bearer from the video capture terminal to a serving gateway.

A5. The mobility management entity stores a mapping relationship between a serial number of the video data and an identifier of the bearer in the bearer setup process.

A6. After the bearer is set up, the video capture terminal uploads the video data to the dispatch station in real time.

A7. The dispatch station makes a loopback decision according to the received video data, and confirms video data to be looped back.

A8. The dispatch station sends a video loopback request to the mobility management entity.

The video loopback request carries a serial number of the video data to be looped back, so that the mobility management entity confirms, according to the serial number of the video data to be looped back, an identifier of a bearer of the video data to be looped back corresponding to the serial number of the video data to be looped back, so that a base station confirms, according to the identifier of the bearer of the video data to be looped back, the video data to be looped back corresponding to the identifier of the bearer of the video data to be looped back, and sends the video data to be looped back to a trunking terminal, where the identifier of the bearer is an identifier of each bearer among N bearers that are set up by the mobility management entity according to the bearer setup request of the video capture terminal and are used for transmitting the N streams of video data, where the bearer setup request carries a serial number of the N streams of video data, and the serial number of each stream of video data corresponds to the identifier of the bearer used for transmitting each stream of video data.

A9. The mobility management entity sends loopback indication information to the base station, and sends a bearer modification request at the same time.

The loopback indication information carries the identifier of the bearer of the video data to be looped back, where the identifier of the bearer is an identifier of each bearer among the N bearers that are set up by the mobility management entity according to the bearer setup request of the video capture terminal and are used for transmitting the N streams of video data, where the bearer setup request carries the serial number of the N streams of video data, the serial number of each stream of video data corresponds to the identifier of the bearer used for transmitting each stream of video data, and the identifier of the bearer of the video data to be looped back is determined by the mobility management entity or the video capture terminal according to the serial number of the video data to be looped back carried in the video loopback request of the dispatch station, where N is an integer greater than or equal to 1; and the loopback indication information sent by the mobility management entity further carries an identifier of a trunking terminal included in each trunking terminal group that needs to monitor the video data to be looped back and a serial number of the video data to be looped back that all trunking terminals in each trunking terminal group need to monitor.

A10. The base station modifies a bearer, and meanwhile stores a mapping relationship between an identifier of the modified bearer and an identifier of the bearer before the modification.

A11. The base station sends a bearer modification response message to the mobility management entity.

A12. The base station sends first monitoring indication information to the trunking terminal.

The first monitoring indication information carries a radio network temporary identifier, an identifier of a trunking terminal included in each trunking terminal group, and the serial number of the video data to be looped back that all trunking terminals in each trunking terminal group need to monitor, so that the trunking terminal confirms, according to an identifier of the trunking terminal itself, a serial number of the video data to be looped back that all trunking terminals in a trunking terminal group including the trunking terminal itself need to monitor, confirms, according to the serial number of the video data to be looped back and monitored, the video data to be looped back and monitored, and uses the radio network temporary identifier to monitor the video data to be looped back.

A13. The video capture terminal sends video data to the base station.

A14. The base station uploads all received video-captured data to the dispatch station.

A15. The base station confirms, according to the loopback indication information and the identifier of the bearer, the video data to be looped back corresponding to the identifier of the bearer, and sends the video data to be looped back to the trunking terminal.

Figure 10:
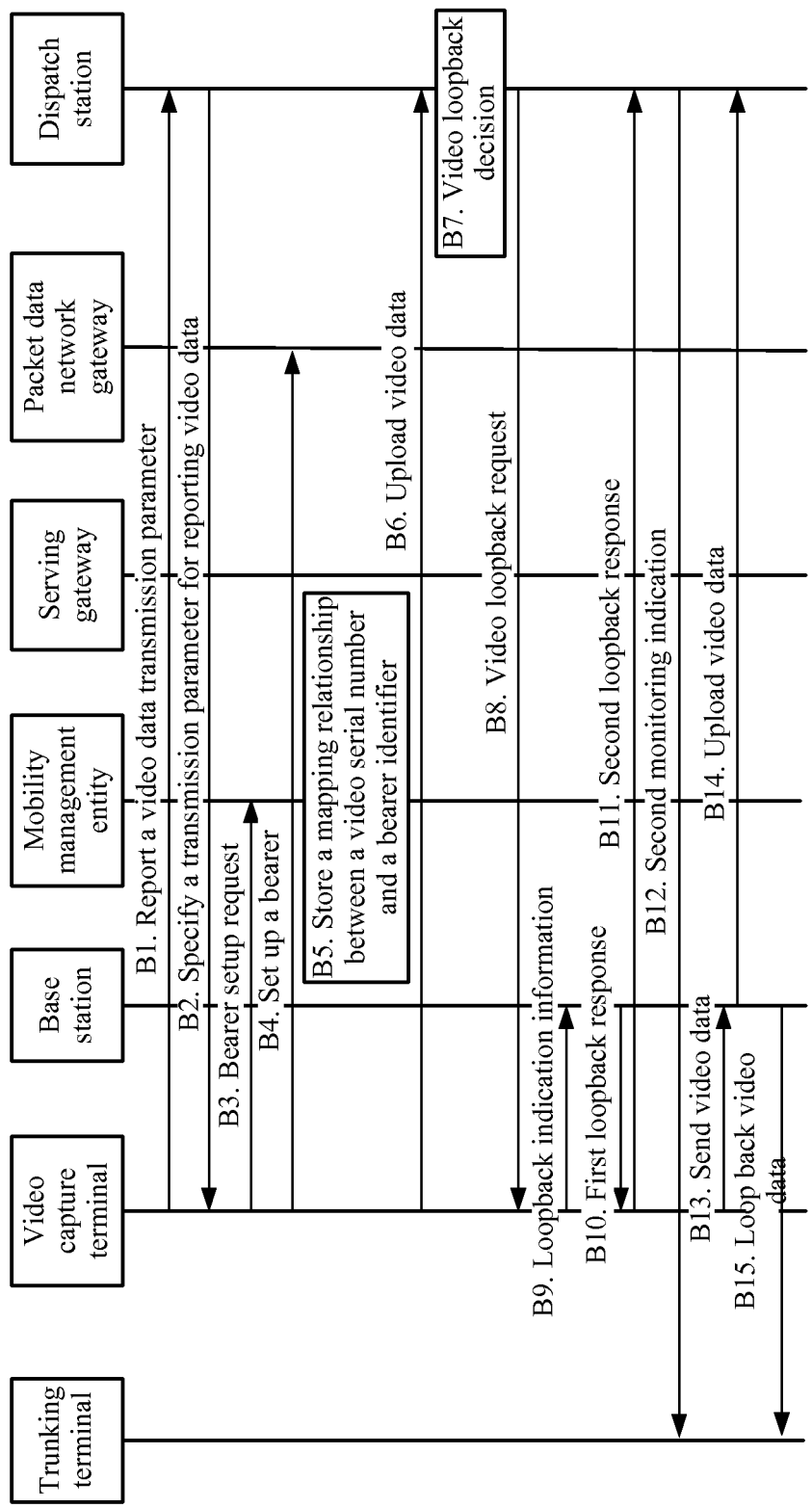
FIG. 10 is a schematic diagram of a data transmission method according to an embodiment of the present invention.

Referring to FIG. 10, another embodiment of a data transmission method in the present invention includes the following:

In this embodiment of the present invention, steps B1-B7 are the same as steps A1-A7. Details are not repeated herein.

B8. The dispatch station sends a video loopback request to the video capture terminal.

The video loopback request carries a serial number of the video data to be looped back, so that the video capture terminal confirms, according to the serial number of the video data to be looped back, an identifier of a bearer of the video data to be looped back corresponding to the serial number of the video data to be looped back, so that a base station confirms, according to the identifier of the bearer of the video data to be looped back, the video data to be looped back corresponding to the identifier of the bearer of the video data to be looped back, and sends the video data to be looped back to a trunking terminal, where the identifier of the bearer is an identifier of each bearer among N bearers that are set up by the mobility management entity according to the bearer setup request of the video capture terminal and are used for transmitting the N streams of video data, where the bearer setup request carries a serial number of the N streams of video data, and the serial number of each stream of video data corresponds to the identifier of the bearer used for transmitting each stream of video data.

B9. The video capture terminal sends loopback indication information to the base station.

The loopback indication information carries the identifier of the bearer of the video data to be looped back, where the identifier of the bearer is an identifier of each bearer among the N bearers that are set up by the mobility management entity according to the bearer setup request of the video capture terminal and are used for transmitting the N streams of video data, where the bearer setup request carries the serial number of the N streams of video data, the serial number of each stream of video data corresponds to the identifier of the bearer used for transmitting each stream of video data, and the identifier of the bearer of the video data to be looped back is determined by the mobility management entity or the video capture terminal according to the serial number of the video data to be looped back carried in the video loopback request of the dispatch station, where N is an integer greater than or equal to 1.

B10. The base station sends a first video loopback response to the video capture terminal.

The first video loopback response carries a radio network temporary identifier allocated to each stream of video data to be looped back, so that the video capture terminal sends a second video loopback response to the dispatch station, where the second video loopback response carries the serial number of each stream of video data to be looped back and the radio network temporary identifier of each stream of video data to be looped back, so that the dispatch station sends second monitoring indication information to the trunking terminal, where the second monitoring indication information carries the radio network temporary identifier, an identifier of a trunking terminal included in each trunking terminal group, and a serial number of the video data to be looped back that all trunking terminals in each trunking terminal group need to monitor, so that the trunking terminal confirms, according to an identifier of the trunking terminal itself, a serial number of the video data to be looped back that all trunking terminals in a trunking terminal group including the trunking terminal itself need to monitor, confirms, according to the serial number of the video data to be looped back and monitored, the video data to be looped back and monitored, and uses the radio network temporary identifier to monitor the video data to be looped back.

B11. The video capture terminal sends a second video loopback response to the dispatch station.

The second video loopback response carries the serial number of each stream of video data to be looped back and the radio network temporary identifier of each stream of video data to be looped back, so that the dispatch station sends second monitoring indication information to the trunking terminal, where the second monitoring indication information carries the radio network temporary identifier, the identifier of the trunking terminal included in each trunking terminal group, and the serial number of the video data to be looped back that all trunking terminals in each trunking terminal group need to monitor, so that the trunking terminal confirms, according to the identifier of the trunking terminal itself, the serial number of the video data to be looped back that all trunking terminals in the trunking terminal group including the trunking terminal itself need to monitor, confirms, according to the serial number of the video data to be looped back and monitored, the video data to be looped back and monitored, and uses the radio network temporary identifier to monitor the video data to be looped back.

B12. The dispatch station sends second monitoring indication information to the trunking terminal.

The second monitoring indication information carries the radio network temporary identifier, the identifier of the trunking terminal included in each trunking terminal group, and the serial number of the video data to be looped back that all trunking terminals in each trunking terminal group need to monitor, so that the trunking terminal confirms, according to the identifier of the trunking terminal itself, the serial number of the video data to be looped back that all trunking terminals in the trunking terminal group including the trunking terminal itself need to monitor, confirms, according to the serial number of the video data to be looped back and monitored, the video data to be looped back and monitored, and uses the radio network temporary identifier to monitor the video data to be looped back.

B13. The video capture terminal sends video data to the base station.

B14. The base station uploads all received video-captured data to the dispatch station.

B15. The base station confirms, according to the loopback indication information and the identifier of the bearer, the video data to be looped back corresponding to the identifier of the bearer, and sends the video data to be looped back to the trunking terminal.

Figure 11:
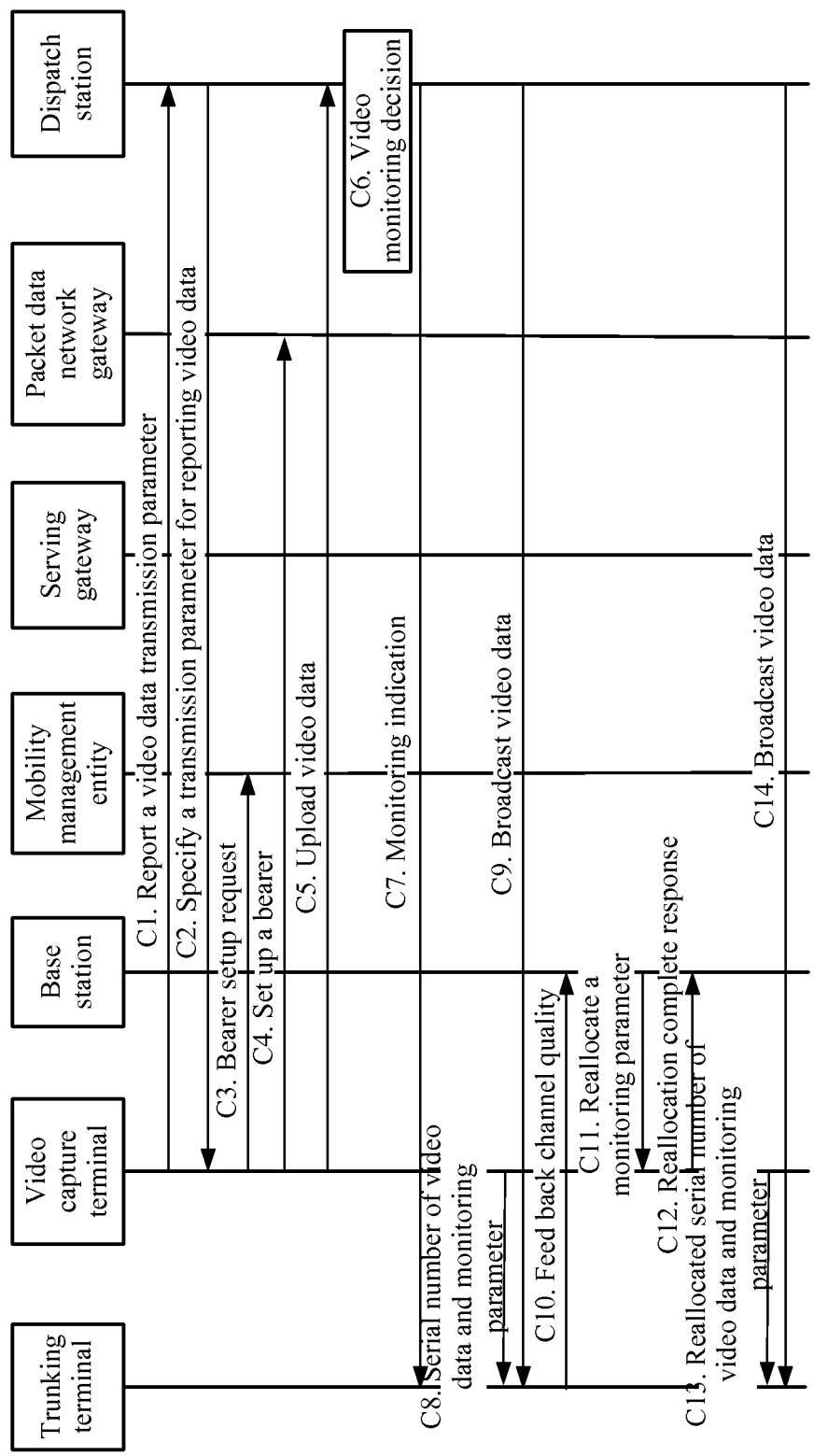
FIG. 11 is a schematic diagram of a data transmission method according to an embodiment of the present invention.

Referring to FIG. 11, another embodiment of a data transmission method includes the following:

Different from the loopback solutions corresponding to FIG. 9 and FIG. 10, this embodiment of the present invention uses a broadcast solution to transmit video data.

In this embodiment of the present invention, steps C1-C2 are the same as steps A1-A2. Details are not repeated herein.

C3. The video capture terminal sends a bearer setup request to a mobility management entity.

The bearer setup request is sent to the mobility management entity, where the bearer setup request carries a serial number of N streams of video data, so that the mobility management entity sets up N evolved packet bearers, each of which is used to transmit one of the N streams of video data.

C4. The mobility management entity sets up a bearer from the video capture terminal to a serving gateway.

C5. After the bearer is set up, the video capture terminal uploads video data to the dispatch station in real time.

C6. The dispatch station decides to monitor video data according to the received video data.

C7. The dispatch station sends monitoring indication information to a trunking terminal.

The monitoring indication information carries an identifier of a trunking terminal included in each trunking terminal group that needs to monitor video data specified to be monitored and a serial number of the video data that all trunking terminals in each trunking terminal group specify to monitor, so that the trunking terminal confirms, according to an identifier of the trunking terminal itself, a serial number of the video data specified to be monitored that all trunking terminals in a trunking terminal group including the trunking terminal itself need to monitor, searches, according to the serial number of the video data specified to be monitored, for a monitoring parameter corresponding to the serial number of the video data specified to be monitored, and uses the found monitoring parameter of the video data specified to be monitored, to monitor the video data specified to be monitored; and the monitoring parameter is a monitoring parameter that is sent, along with a serial number of the N streams of video data, to the trunking terminal by a video capture terminal, where the serial number of the N streams of video data and the monitoring parameter are sent by a base station to the video capture terminal after the base station receives the N streams of video data broadcasted by the video capture terminal; and the monitoring parameter corresponds to a serial number of each stream of video data among the N streams of video data.

C8. The video capture terminal sends the serial number of the N streams of video data and the monitoring parameter corresponding to the serial number of each stream of video data in the N streams of video data to the trunking terminal.

The monitoring parameter corresponding to the serial number of the video data is configured by the base station for the video capture terminal.

C9. The video capture terminal broadcasts video data.

The N streams of video data are broadcasted, so that the dispatch station sends the monitoring indication information to the trunking terminal according to the N streams of video data, where the monitoring indication information carries a serial number of video data specified to be monitored in the N streams of video data, so that the trunking terminal searches, according to the serial number of the video data specified to be monitored, for a monitoring parameter corresponding to the serial number of the video data specified to be monitored, and uses the found monitoring parameter of the video data specified to be monitored, to monitor the video data specified to be monitored.

The video data broadcasted by the video capture terminal may be monitored by both the trunking terminal and the base station. After monitoring the video data, the base station reports the video data to the dispatch station.

C10. The trunking terminal may further monitor channel quality when monitoring the video data specified by the dispatch station, and feeds back the monitored channel quality to the base station; when the channel quality is poor, the base station may reallocate a monitoring parameter.

C11. The base station reallocates a monitoring parameter to the video capture terminal.

This process is actually a process of triggering, by the base station, a radio resource control (RRC, Radio Resource Control) connection reconfiguration, so as to adjust a modulation and coding scheme, resource allocation, transmit power, and the like for video broadcast of the video capture terminal.

C12. The video capture terminal sends a reallocation complete response to the base station.

C13. The video capture terminal sends the reallocated monitoring parameter to the trunking terminal, so that the trunking terminal uses the reallocated monitoring parameter to monitor the video data specified to be monitored.

C14. The video capture terminal broadcasts video data.

Figure 12:
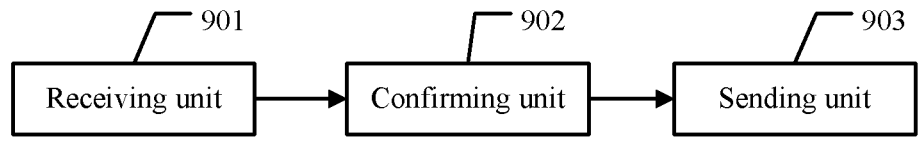
FIG. 12 is a schematic diagram of a base station according to an embodiment of the present invention.

Referring to FIG. 12, a base station provided by an embodiment of the present invention includes:

a receiving unit 901, configured to receive N streams of video data uploaded by a video capture terminal, and receive loopback indication information sent by a mobility management entity or the video capture terminal, where the loopback indication information carries an identifier of a bearer of video data to be looped back, where the identifier of the bearer is an identifier of each bearer among N bearers that are set up by the mobility management entity according to a bearer setup request of the video capture terminal and are used for transmitting the N streams of video data, where the bearer setup request carries a serial number of the N streams of video data, the serial number of each stream of video data corresponds to the identifier of the bearer used for transmitting each stream of video data, and the identifier of the bearer of the video data to be looped back is determined by the mobility management entity or the video capture terminal according to a serial number of the video data to be looped back carried in a video loopback request of a dispatch station, where N is an integer greater than or equal to 1;

a confirming unit 902, configured to confirm, according to the identifier of the bearer of the video data to be looped back received by the receiving unit 901, the video data to be looped back corresponding to the identifier of the bearer of the video data to be looped back; and a sending unit 903, configured to send the video data to be looped back confirmed by the confirming unit 902.

In this embodiment of the present invention, a receiving unit 901 receives N streams of video data uploaded by a video capture terminal and receives loopback indication information sent by a mobility management entity or the video capture terminal, where the loopback indication information carries an identifier of a bearer of video data to be looped back, where the identifier of the bearer is an identifier of each bearer among N bearers that are set up by the mobility management entity according to a bearer setup request of the video capture terminal and are used for transmitting the N streams of video data, where the bearer setup request carries a serial number of the N streams of video data, the serial number of each stream of video data corresponds to the identifier of the bearer used for transmitting each stream of video data, and the identifier of the bearer of the video data to be looped back is determined by the mobility management entity or the video capture terminal according to a serial number of the video data to be looped back carried in a video loopback request of a dispatch station, where N is an integer greater than or equal to 1; a confirming unit 902 confirms, according to the identifier of the bearer of the video data to be looped back received by the receiving unit 901, the video data to be looped back corresponding to the identifier of the bearer of the video data to be looped back; and a sending unit 903 sends the video data to be looped back, which is confirmed by the confirming unit 902, to a trunking terminal. In comparison with the prior art, the base station provided by this embodiment of the present invention may reduce a transmission delay and transmit video data obtained by video surveillance to the trunking terminal in real time.

Figure 13:
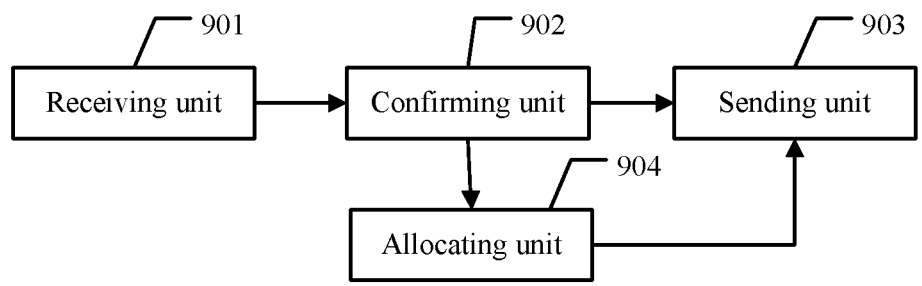
FIG. 13 is a schematic diagram of a base station according to an embodiment of the present invention.

On the basis of the embodiment corresponding to FIG. 12, referring to FIG. 13, another embodiment of the base station includes:

an allocating unit 904, configured to allocate a radio network temporary identifier to each stream of video data to be looped back confirmed by the confirming unit;

where, the sending unit 903 is further configured to send first monitoring indication information to the trunking terminal or send a first video loopback response to the video capture terminal; where the first monitoring indication information carries the radio network temporary identifier, an identifier of a trunking terminal included in each trunking terminal group, and a serial number of the video data to be looped back that all trunking terminals in each trunking terminal group need to monitor, so that the trunking terminal confirms, according to an identifier of the trunking terminal itself, the serial number of the video data to be looped back that all trunking terminals in a trunking terminal group including the trunking terminal itself need to monitor, confirms, according to the serial number of the video data to be looped back and monitored, the video data to be looped back and monitored, and uses the radio network temporary identifier to monitor the video data to be looped back; and the first video loopback response carries the radio network temporary identifier allocated to each stream of video data to be looped back, so that the video capture terminal sends a second video loopback response to the dispatch station, where the second video loopback response carries the serial number of each stream of video data to be looped back and the radio network temporary identifier of each stream of video data to be looped back, so that the dispatch station sends second monitoring indication information to the trunking terminal, where the second monitoring indication information carries the radio network temporary identifier, the identifier of the trunking terminal included in each trunking terminal group, and the serial number of the video data to be looped back that all trunking terminals in each trunking terminal group need to monitor, so that the trunking terminal confirms, according to the identifier of the trunking terminal itself, the serial number of the video data to be looped back that all trunking terminals in the trunking terminal group including the trunking terminal itself need to monitor, confirms, according to the serial number of the video data to be looped back and monitored, the video data to be looped back and monitored, and uses the radio network temporary identifier to monitor the video data to be looped back.

Figure 14:
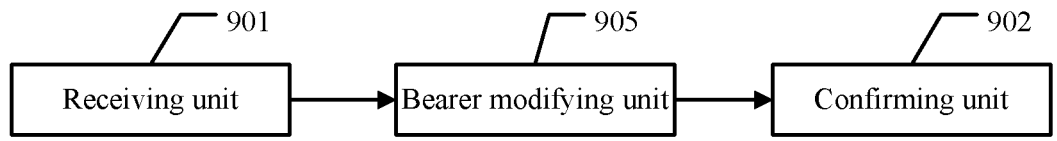
FIG. 14 is a schematic diagram of a base station according to an embodiment of the present invention.

On the basis of the embodiment corresponding to FIG. 12 or FIG. 13, referring to FIG. 14, another embodiment of the base station includes:

the receiving unit 901 is configured to receive a bearer modification request sent by the mobility management entity;

the bearer modifying unit 905 is configured to modify a video data transmission bearer after the receiving unit 901 receives the bearer modification request; and the confirming unit 902 is configured to confirm a mapping relationship between an identifier of the transmission bearer modified by the bearer modifying unit 905 and an identifier of the transmission bearer before the modification.

Figure 15:
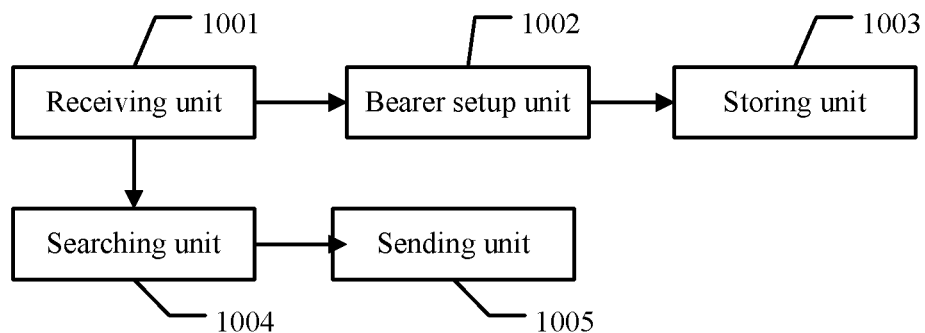
FIG. 15 is a schematic diagram of a mobility management entity according to an embodiment of the present invention.

Referring to FIG. 15, an embodiment of a mobility management entity includes:

a receiving unit 1001, configured to receive a bearer setup request sent by a video capture terminal, where the bearer setup request carries a serial number of N streams of video data;

a bearer setup unit 1002, configured to set up N evolved packet bearers after the receiving unit 1001 receives the bearer setup request, where each bearer is used to transmit one of the N streams of video data;

a storing unit 1003, configured to correspondingly store, after the bearer setup unit 1002 sets up the bearers, an identifier of each bearer used for transmitting the one stream of video data and a serial number of the one stream of video data transmitted on the bearer, where N is an integer greater than or equal to 1;

where the receiving unit 1001 is further configured to receive a video loopback request sent by a dispatch station, where the video loopback request carries a serial number of video data to be looped back;

a searching unit 1004, configured to search, according to the serial number of the video data to be looped back received by the receiving unit 1001, the stored mapping relationship between a serial number of video data and an identifier of a bearer, for an identifier of a bearer corresponding to the serial number of the video data to be looped back; and a sending unit 1005, configured to send loopback indication information to a base station, where the loopback indication information carries the found identifier of the bearer of the video data to be looped back, so that the base station confirms, according to the identifier of the bearer of the video data to be looped back, the video data to be looped back corresponding to the identifier of the bearer of the video data to be looped back, and sends the video data to be looped back to a trunking terminal.

In this embodiment of the present invention, a receiving unit 1001 receives a bearer setup request sent by a video capture terminal, where the bearer setup request carries a serial number of N streams of video data; a bearer setup unit 1002 sets up N evolved packet bearers after the receiving unit 1001 receives the bearer setup request, where each bearer is used to transmit one of the N streams of video data; a storing unit 1003 correspondingly stores, after the bearer setup unit 1002 sets up the bearers, an identifier of each bearer used for transmitting the one stream of video data and a serial number of the one stream of video data transmitted on the bearer, where N is an integer greater than or equal to 1; the receiving unit 1001 is further configured to receive a video loopback request sent by a dispatch station, where the video loopback request carries a serial number of video data to be looped back; a searching unit 1004 searches, according to the serial number of the video data to be looped back received by the receiving unit 1001, the stored mapping relationship between a serial number of video data and an identifier of bearer, for an identifier of a bearer corresponding to the serial number of the video data to be looped back; and a sending unit 1005 is configured to send loopback indication information to a base station, where the loopback indication information carries the found identifier of the bearer of the video data to be looped back, so that the base station confirms, according to the identifier of the bearer of the video data to be looped back, the video data to be looped back corresponding to the identifier of the bearer of the video data to be looped back, and sends the video data to be looped back to a trunking terminal. In comparison with the prior art, the mobility management entity provided by this embodiment of the present invention may reduce a transmission delay and transmit video data obtained by video surveillance to the trunking terminal in real time.

On the basis of the embodiment corresponding to FIG. 15, in the embodiment of the mobility management entity:

the sending unit 1005 is further configured to send a bearer modification request to the base station, so that the base station modifies a video data transmission bearer, and confirms a mapping relationship between an identifier of the modified transmission bearer and an identifier of the transmission bearer before the modification.

Figure 16:
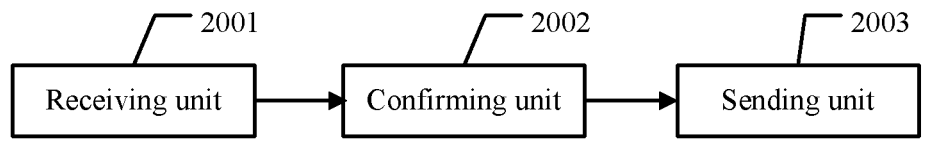
FIG. 16 is a schematic diagram of a dispatch station according to an embodiment of the present invention.

Referring to FIG. 16, an embodiment of a dispatch station includes:

a receiving unit 2001, configured to instruct, after receiving M video data serial numbers reported by a video capture terminal, the video capture terminal to report video data corresponding to N video data serial numbers specified in the M video data serial numbers, where M is greater than or equal to N, and N is an integer greater than or equal to 1; and receive N streams of video data uploaded by the video capture terminal;

a confirming unit 2002, configured to confirm, after the receiving unit 2001 receives the N streams of video data uploaded by the video capture terminal, video data to be looped back; and a sending unit 2003, configured to send a video loopback request to a mobility management entity or the video capture terminal after the confirming unit 2002 confirms the video data to be looped back, where the video loopback request carries a serial number of the video data to be looped back, so that the mobility management entity or the video capture terminal confirms, according to the serial number of the video data to be looped back, an identifier of a bearer of the video data to be looped back corresponding to the serial number of the video data to be looped back, so that a base station confirms, according to the identifier of the bearer of the video data to be looped back, the video data to be looped back corresponding to the identifier of the bearer of the video data to be looped back, and sends the video data to be looped back to a trunking terminal, where the identifier of the bearer is an identifier of each bearer among N bearers that are set up by the mobility management entity according to a bearer setup request of the video capture terminal and are used for transmitting the N streams of video data, where the bearer setup request carries a serial number of the N streams of video data, and the serial number of each stream of video data corresponds to the identifier of the bearer used for transmitting each stream of video data.

In this embodiment of the present invention, after receiving M video data serial numbers reported by a video capture terminal, a receiving unit 2001 instructs the video capture terminal to report video data corresponding to N video data serial numbers specified in the M video data serial numbers, where M is greater than or equal to N, and N is an integer greater than or equal to 1, and receives N streams of video data uploaded by the video capture terminal; after the receiving unit 2001 receives the N streams of video data uploaded by the video capture terminal, a confirming unit 2002 confirms video data to be looped back; and a sending unit 2003 sends a video loopback request to a mobility management entity or the video capture terminal after the confirming unit 2002 confirms the video data to be looped back, where the video loopback request carries a serial number of the video data to be looped back, so that the mobility management entity or the video capture terminal confirms, according to the serial number of the video data to be looped back, an identifier of a bearer of the video data to be looped back corresponding to the serial number of the video data to be looped back, so that a base station confirms, according to the identifier of the bearer of the video data to be looped back, the video data to be looped back corresponding to the identifier of the bearer of the video data to be looped back, and sends the video data to be looped back to a trunking terminal, where the identifier of the bearer is an identifier of each bearer among N bearers that are set up by the mobility management entity according to a bearer setup request of the video capture terminal and are used for transmitting the N streams of video data, where the bearer setup request carries a serial number of the N streams of video data, and the serial number of each stream of video data corresponds to the identifier of the bearer used for transmitting each stream of video data. In comparison with the prior art, the dispatch station provided by this embodiment of the present invention may reduce a transmission delay and transmit video data obtained by video surveillance to the trunking terminal in real time.

On the basis of the embodiment corresponding to FIG. 16, another embodiment of the dispatch station includes the following:

the receiving unit 2001 is configured to receive a video loopback response sent by the video capture terminal, where the video loopback response carries the serial number of the video data to be looped back and a radio network temporary identifier corresponding to the serial number; and the sending unit 2003 is configured to send second monitoring indication information to the trunking terminal after the receiving unit receives the video loopback response, where the second monitoring indication information carries the radio network temporary identifier, an identifier of a trunking terminal included in each trunking terminal group, and a serial number of the video data to be looped back that all trunking terminals in each trunking terminal group need to monitor, so that the trunking terminal confirms, according to an identifier of the trunking terminal itself, the serial number of the video data to be looped back that all trunking terminals in a trunking terminal group including the trunking terminal itself need to monitor, confirms, according to the serial number of the video data to be looped back and monitored, the video data to be looped back and monitored, and uses the radio network temporary identifier to monitor the video data to be looped back.

Figure 17:
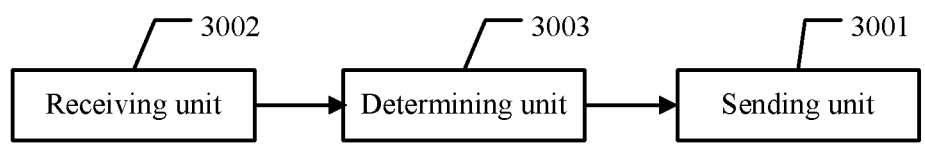
FIG. 17 is a schematic diagram of a video capture terminal according to an embodiment of the present invention.

Referring to FIG. 17, an embodiment of a video capture terminal includes:

a sending unit 3001, configured to send, after negotiating with a dispatch station about a serial number of N streams of video data to be reported, the N streams of video data corresponding to the serial number of the N streams of video data to a base station, and send a bearer setup request to a mobility management entity, where the bearer setup request carries the serial number of the N streams of video data, so that the mobility management entity sets up N evolved packet bearers, each of which is used to transmit one of the N streams of video data, and correspondingly stores an identifier of each bearer used for transmitting the one stream of video data and a serial number of the one stream of video data transmitted on the bearer;

a receiving unit 3002, configured to receive a video loopback request sent by the dispatch station, where the video loopback request carries a serial number of video data to be looped back; and a determining unit 3003, configured to determine, according to the serial number of the video data to be looped back carried in the video loopback request received by the receiving unit 3002, an identifier of a bearer of the video data to be looped back;

where the sending unit 3001 is further configured to send loopback indication information to the base station, where the loopback indication information carries the identifier of the bearer of the video data to be looped back, so that the base station confirms, according to the identifier of the bearer of the video data to be looped back, the video data to be looped back corresponding to the identifier of the bearer of the video data to be looped back, and sends the video data to be looped back to a trunking terminal.

In this embodiment of the present invention, after negotiating with a dispatch station about a serial number of N streams of video data to be reported, a sending unit 3001 sends the N streams of video data corresponding to the serial number of the N streams of video data to a base station, and sends a bearer setup request to a mobility management entity, where the bearer setup request carries the serial number of the N streams of video data, so that the mobility management entity sets up N evolved packet bearers, each of which is used to transmit one of the N streams of video data, and correspondingly stores an identifier of each bearer used for transmitting the one stream of video data and a serial number of the one stream of video data transmitted on the bearer; a receiving unit 3002 receives a video loopback request sent by the dispatch station, where the video loopback request carries a serial number of video data to be looped back; a determining unit 3003 determines, according to the serial number of the video data to be looped back carried in the video loopback request received by the receiving unit 3002, an identifier of a bearer of the video data to be looped back; and the sending unit 3001 sends loopback indication information to the base station, where the loopback indication information carries the identifier of the bearer of the video data to be looped back, so that the base station confirms, according to the identifier of the bearer of the video data to be looped back, the video data to be looped back corresponding to the identifier of the bearer of the video data to be looped back, and sends the video data to be looped back to a trunking terminal. In comparison with the prior art, the video capture terminal provided by this embodiment of the present invention may reduce a transmission delay and transmit video data obtained by video surveillance to the trunking terminal in real time.

On the basis of the embodiment corresponding to FIG. 17, another embodiment of the video capture terminal includes the following:

the receiving unit 3002 is further configured to receive a first video loopback response sent by the base station, where the first video loopback response carries a radio network temporary identifier allocated to each stream of video data to be looped back; and the sending unit 3001 is further configured to send a second video loopback response to the dispatch station after the receiving unit 3002 receives the first video loopback response, where the second video loopback response carries the serial number of each stream of video data to be looped back and the radio network temporary identifier of each stream of video data to be looped back, so that the dispatch station sends second monitoring indication information to the trunking terminal, where the second monitoring indication information carries the radio network temporary identifier, an identifier of a trunking terminal included in each trunking terminal group, and a serial number of video data to be looped back that all trunking terminals in each trunking terminal group need to monitor, so that the trunking terminal confirms, according to an identifier of the trunking terminal itself, a serial number of the video data to be looped back that all trunking terminals in a trunking terminal group including the trunking terminal itself need to monitor, confirms, according to the serial number of the video data to be looped back and monitored, the video data to be looped back and monitored, and uses the radio network temporary identifier to monitor the video data to be looped back.

Figure 18:
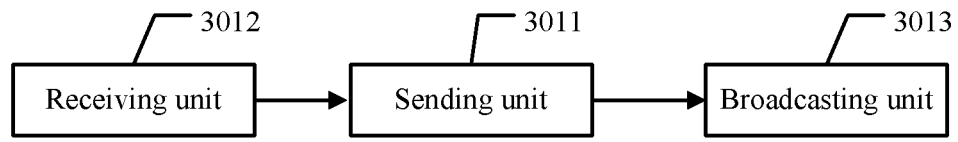
FIG. 18 is a schematic diagram of a video capture terminal according to an embodiment of the present invention.

Referring to FIG. 18, an embodiment of a video capture terminal includes:

a sending unit 3011, configured to send a bearer setup request to a mobility management entity, where the bearer setup request carries a serial number of N streams of video data, so that the mobility management entity sets up N evolved packet bearers, each of which is used to transmit one of the N streams of video data;

a receiving unit 3012, configured to receive a monitoring parameter sent by a base station and corresponding to each stream of video data in the N streams of video data;

where the sending unit 3011 is further configured to send the serial number of the N streams of video data and the monitoring parameter received by the receiving unit 3012 and corresponding to the serial number of each stream of video data in the N streams of video data to a trunking terminal; and a broadcasting unit 3013, configured to broadcast the N streams of video data, so that a dispatch station sends monitoring indication information to the trunking terminal according to the N streams of video data, where the monitoring indication information carries a serial number of video data specified to be monitored in the N streams of video data, so that the trunking terminal searches, according to the serial number of the video data specified to be monitored, for a monitoring parameter corresponding to the serial number of the video data specified to be monitored, and uses the found monitoring parameter of the video data specified to be monitored, to monitor the video data specified to be monitored.

In this embodiment of the present invention, a sending unit 3011 sends a bearer setup request to a mobility management entity, where the bearer setup request carries a serial number of N streams of video data, so that the mobility management entity sets up N evolved packet bearers, each of which is used to transmit one of the N streams of video data; a receiving unit 3012 receives a monitoring parameter sent by a base station and corresponding to each stream of video data in the N streams of video data; the sending unit 3011 sends the serial number of the N streams of video data and the monitoring parameter received by the receiving unit 3012 and corresponding to the serial number of each stream of video data in the N streams of video data to a trunking terminal; and a broadcasting unit 3013 broadcasts the N streams of video data, so that a dispatch station sends monitoring indication information to the trunking terminal according to the N streams of video data, where the monitoring indication information carries a serial number of video data specified to be monitored in the N streams of video data, so that the trunking terminal searches, according to the serial number of the video data specified to be monitored, for a monitoring parameter corresponding to the serial number of the video data specified to be monitored, and uses the found monitoring parameter of the video data specified to be monitored, to monitor the video data specified to be monitored. The video capture terminal provided by this embodiment of the present invention only monitors data that the dispatch station specifies to monitor. This, in comparison with the prior art, neither causes a transmission delay, nor requires a piece of data to be sent twice in uplink and downlink directions, thereby effectively improving spectrum utilization. The video capture terminal broadcasts video data, and the trunking terminal only monitors, according to the indication of the dispatch station, data that the dispatch station specifies to monitor. This neither causes a transmission delay, nor requires a piece of data to be sent twice in uplink and downlink directions, thereby effectively improving spectrum utilization.

On the basis of the embodiment corresponding to FIG. 18, another embodiment of the video capture terminal includes the following:

the receiving unit 3012 is further configured to receive an adjusted monitoring parameter sent by the base station and corresponding to the N streams of video data; and the sending unit 3011 is further configured to send, to the trunking terminal, the serial number of the N streams of video data and the adjusted monitoring parameter received by the receiving unit 3012 and corresponding to the serial number of the N streams of video data, so that the trunking terminal searches, according to the serial number of the video data specified to be monitored, for an adjusted monitoring parameter corresponding to the serial number of the video data specified to be monitored, and uses the found adjusted monitoring parameter to monitor the video data specified to be monitored.

Figure 19:
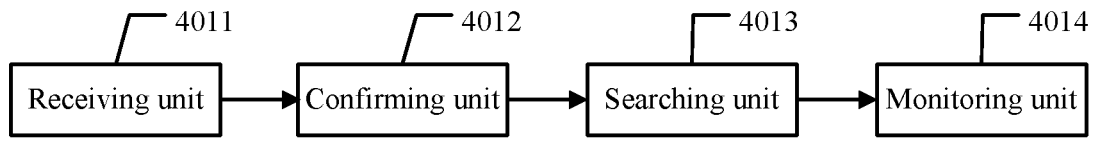
FIG. 19 is a schematic diagram of a trunking terminal according to an embodiment of the present invention.

Referring to FIG. 19, an embodiment of a trunking terminal in the present invention includes:

a receiving unit 4011, configured to receive monitoring indication information sent by a dispatch station, where the monitoring indication information carries an identifier of a trunking terminal included in each trunking terminal group that needs to monitor video data specified to be monitored and a serial number of the video data that all trunking terminals in each trunking terminal group specify to monitor; and receive a serial number of N streams of video data and a monitoring parameter corresponding to the serial number of each stream of video data in the N streams of video data, which are sent by a video capture terminal;

a confirming unit 4012, configured to confirm, according to an identifier of the trunking terminal itself, a serial number of the video data specified to be monitored that all trunking terminals in a trunking terminal group including the trunking terminal itself need to monitor, among the identifier that is of the trunking terminal included in each trunking terminal group and is carried in the monitoring indication information received by the receiving unit 4011 and the serial number of the video data that all trunking terminals in each trunking terminal group specify to monitor;

a searching unit 4013, configured to search, according to the serial number that is of the video data specified to be monitored and is confirmed by the confirming unit 4012, for a monitoring parameter corresponding to the serial number of the video data specified to be monitored; and a monitoring unit 4014, configured to use the monitoring parameter that is of the video data specified to be monitored and is found by the searching unit 4013, to monitor the video data specified to be monitored.

In this embodiment of the present invention, a receiving unit 4011 receives monitoring indication information sent by a dispatch station, where the monitoring indication information carries an identifier of a trunking terminal included in each trunking terminal group that needs to monitor video data specified to be monitored and a serial number of the video data that all trunking terminals in each trunking terminal group specify to monitor, and receives a serial number of N streams of video data and a monitoring parameter corresponding to the serial number of each stream of video data in the N streams of video data, which are sent by a video capture terminal; a confirming unit 4012 confirms, according to an identifier of the trunking terminal itself, a serial number of the video data specified to be monitored that all trunking terminals in a trunking terminal group including the trunking terminal itself need to monitor, among the identifier that is of the trunking terminal included in each trunking terminal group and is carried in the monitoring indication information received by the receiving unit 4011 and the serial number of the video data that all trunking terminals in each trunking terminal group specify to monitor; a searching unit 4013 searches, according to the serial number that is of the video data specified to be monitored and is confirmed by the confirming unit 4012, for a monitoring parameter corresponding to the serial number of the video data specified to be monitored; and a monitoring unit 4014 uses the monitoring parameter that is of the video data specified to be monitored and is found by the searching unit 4013, to monitor the video data specified to be monitored. The trunking terminal provided by this embodiment of the present invention only monitors data that the dispatch station specifies to monitor. This, in comparison with the prior art, neither causes a transmission delay, nor requires a piece of data to be sent twice in uplink and downlink directions, thereby effectively improving spectrum utilization.

Figure 20:
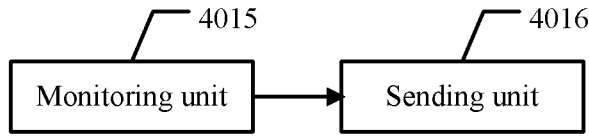
FIG. 20 is a schematic diagram of a trunking terminal according to an embodiment of the present invention.

On the basis of the embodiment corresponding to FIG. 19, referring to FIG. 20, another embodiment of the trunking terminal further includes:

a monitoring unit 4015, configured to monitor channel quality of the video capture terminal; and a sending unit 4016, configured to send the channel quality to a base station, so that the base station reconfigures, according to the channel quality, a monitoring parameter corresponding to the serial number of the N streams of video data.

Figure 21:
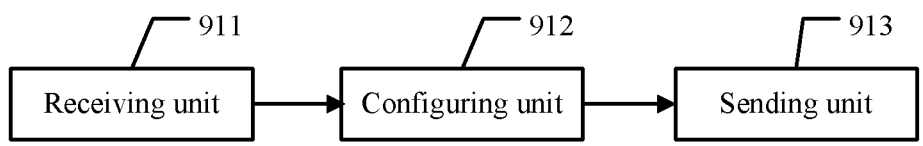
FIG. 21 is a schematic diagram of a base station according to an embodiment of the present invention.

Referring to FIG. 21, another embodiment of a base station includes:

a receiving unit 911, configured to receive N streams of video data broadcasted by a video capture terminal;

a configuring unit 912, adapted to configure a monitoring parameter for each stream of video data in the N streams of video data received by the receiving unit 911; and a sending unit 913, configured to send the monitoring parameter configured by the configuring unit 912 for each stream of video data in the N streams of video data to the video capture terminal, so that the video capture terminal sends a serial number of the N streams of video data and the monitoring parameter corresponding to the serial number of each stream of video data in the N streams of video data to a trunking terminal, so that the trunking terminal searches, according to a serial number of video data specified to be monitored, for a monitoring parameter corresponding to the serial number of the video data specified to be monitored, and uses the found monitoring parameter of the video data specified to be monitored, to monitor the video data specified to be monitored.

In this embodiment of the present invention, a receiving unit 911 receives N streams of video data broadcasted by a video capture terminal; a configuring unit 912 configures a monitoring parameter for each stream of video data in the N streams of video data received by the receiving unit 911; and a sending unit 913 sends the monitoring parameter configured by the configuring unit 912 for each stream of video data in the N streams of video data to the video capture terminal, so that the video capture terminal sends a serial number of the N streams of video data and the monitoring parameter corresponding to the serial number of each stream of video data in the N streams of video data to a trunking terminal, so that the trunking terminal searches, according to a serial number of video data specified to be monitored, for a monitoring parameter corresponding to the serial number of the video data specified to be monitored, and uses the found monitoring parameter of the video data specified to be monitored, to monitor the video data specified to be monitored. In comparison with the prior art, the base station provided by this embodiment of the present invention may reduce a transmission delay.

On the basis of the embodiment corresponding to FIG. 21, another embodiment of the base station includes the following:

the receiving unit 911 is configured to receive channel quality of the video capture terminal sent by the trunking terminal; and the configuring unit 912 is further configured to adjust, according to the channel quality of the video capture terminal received by the receiving unit, a monitoring parameter corresponding to the serial number of the N streams of video data, and send the adjusted monitoring parameter corresponding to the serial number of the N streams of video data to the video capture terminal, so that the video capture terminal sends the serial number of the N streams of video data and an adjusted monitoring parameter corresponding to the serial number of each stream of video data in the N streams of video data to the trunking terminal, so that the trunking terminal searches, according to the serial number of the video data specified to be monitored, for an adjusted monitoring parameter corresponding to the serial number of the video data specified to be monitored, and uses the found adjusted monitoring parameter of the video data specified to be monitored, to monitor the video data specified to be monitored.

Figure 22:
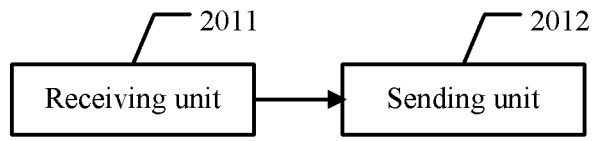
FIG. 22 is a schematic diagram of a dispatch station according to an embodiment of the present invention.

Referring to FIG. 22, another embodiment of a dispatch station includes:

a receiving unit 2011, configured to receive N streams of video data; and a sending unit 2012, configured to send monitoring indication information to a trunking terminal after the receiving unit 2011 receives the N streams of video data, where the monitoring indication information carries an identifier of a trunking terminal included in each trunking terminal group that needs to monitor video data specified to be monitored and a serial number of the video data that all trunking terminals in each trunking terminal group specify to monitor, so that the trunking terminal confirms, according to an identifier of the trunking terminal itself, a serial number of the video data specified to be monitored that all trunking terminals in a trunking terminal group including the trunking terminal itself need to monitor, searches, according to the serial number of the video data specified to be monitored, for a monitoring parameter corresponding to the serial number of the video data specified to be monitored, and uses the found monitoring parameter of the video data specified to be monitored, to monitor the video data specified to be monitored;

where the monitoring parameter is a monitoring parameter that is sent, along with a serial number of the N streams of video data, to the trunking terminal by a video capture terminal, where the serial number of the N streams of video data and the monitoring parameter are sent by a base station to the video capture terminal after the base station receives the N streams of video data broadcasted by the video capture terminal; and the monitoring parameter corresponds to a serial number of each stream of video data among the N streams of video data.

Referring to FIG. 9 and FIG. 10, an embodiment of a video surveillance system includes a trunking terminal, a video capture terminal, a base station, a mobility management entity, a serving gateway, a packet data network gateway, and a dispatch station, where:

the video capture terminal sends a bearer setup request to the mobility management entity after negotiating with the dispatch station about a serial number of N streams of video data to be reported, where the bearer setup request carries the serial number of the N streams of video data;

the mobility management entity sets up N evolved packet bearers, each of which is used to transmit one of the N streams of video data, and correspondingly stores an identifier of each bearer used for transmitting the one stream of video data and a serial number of the one stream of video data transmitted on the bearer, where N is an integer greater than or equal to 1;

the mobility management entity or the video capture terminal receives a video loopback request sent by the dispatch station, where the video loopback request carries a serial number of video data to be looped back, so that the mobility management entity or the video capture terminal confirms, according to the serial number of the video data to be looped back, an identifier of a bearer of the video data to be looped back corresponding to the serial number of the video data to be looped back;

the base station receives loopback indication information sent by the mobility management entity or the video capture terminal, where the loopback indication information carries the identifier of the bearer of the video data to be looped back, confirms, according to the identifier of the bearer of the video data to be looped back, the video data to be looped back corresponding to the identifier of the bearer of the video data to be looped back, and sends the video data to be looped back to the trunking terminal; and the trunking terminal monitors the video data to be looped back.

Referring to FIG. 11, another embodiment of a video surveillance system includes a trunking terminal, a video capture terminal, a base station, a mobility management entity, a serving gateway, a packet data network gateway, and a dispatch station, where:

the video capture terminal sends a bearer setup request to the mobility management entity after negotiating with the dispatch station about a serial number of N streams of video data to be reported, where the bearer setup request carries the serial number of the N streams of video data;

the mobility management entity sets up N evolved packet bearers, each of which is used to transmit one of the N streams of video data, where N is an integer greater than or equal to 1;

the base station configures a monitoring parameter for each stream of video data in the N streams of video data after receiving the N streams of video data broadcasted by the video capture terminal, and sends the monitoring parameter corresponding to each stream of video data in the N streams of video data to the video capture terminal;

the video capture terminal receives the monitoring parameter sent by the base station and corresponding to each stream of video data in the N streams of video data, sends the serial number of the N streams of video data and the monitoring parameter corresponding to the serial number of each stream of video data in the N streams of video data to the trunking terminal, and broadcasts the N streams of video data;

the dispatch station sends the monitoring parameter corresponding to each stream of video data in the N streams of video data to the video capture terminal; and the trunking terminal receives monitoring indication information sent by the dispatch station, where the monitoring indication information carries an identifier of a trunking terminal included in each trunking terminal group that needs to monitor video data specified to be monitored and a serial number of the video data that all trunking terminals in each trunking terminal group specify to monitor; and receives the serial number of the N streams of video data sent by the video capture terminal and the monitoring parameter corresponding to the serial number of each stream of video data in the N streams of video data; confirms, according to an identifier of the trunking terminal itself, a serial number of the video data specified to be monitored that all trunking terminals in a trunking terminal group including the trunking terminal itself need to monitor, among the identifier of the trunking terminal included in each trunking terminal group and the serial number of the video data that all trunking terminals in each trunking terminal group specify to monitor; searches, according to the serial number of the video data specified to be monitored, for a monitoring parameter corresponding to the serial number of the video data specified to be monitored; and uses the found monitoring parameter of the video data specified to be monitored, to monitor the video data specified to be monitored.

By using the technical solutions provided by multiple embodiments of the present invention, a transmission delay may be reduced or ignored.

A person of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disc, or an optical disc.

The data transmission method, device, and system provided by the embodiments of the present invention have been described in detail. Although the principles and implementation manners of the present invention are described with reference to exemplary embodiments, the embodiments are merely described to help understand the method and core idea of the present invention. In addition, with respect to the implementation manners and application scope of the present invention, modifications and variations may be made by persons of ordinary skill in the art according to the idea of the present invention. Therefore, the specification shall not be construed as a limitation on the present invention.

What is claimed is:

1. A data transmission method, comprising:
   receiving N streams of video data uploaded by a video capture terminal;
   receiving loopback indication information sent by a mobility management entity or the video capture terminal, wherein the loopback indication information carries an identifier of a bearer of video data to be looped back, wherein the identifier of the bearer is an identifier of the bearer among N bearers that are set up by the mobility management entity according to a bearer setup request of the video capture terminal and are used for transmitting the N streams of video data, wherein the bearer setup request carries a serial number of the N streams of video data, a serial number of each stream of video data corresponds to the identifier of the bearer used for transmitting each stream of video data, and the identifier of the bearer of the video data to be looped back is determined by the mobility management entity or the video capture terminal according to a serial number of the video data to be looped back carried in a video loopback request of a dispatch station, wherein N is an integer greater than or equal to 1;
   confirming, according to the identifier of the bearer of the video data to be looped back, the video data to be looped back corresponding to the identifier of the bearer of the video data to be looped back; and
   sending the video data to be looped back to a trunking terminal,
   wherein the loopback indication information sent by the mobility management entity further carries an identifier of a trunking terminal comprised in each trunking terminal group that needs to monitor the video data to be looped back and a serial number of the video data to be looped back that all trunking terminals in each trunking terminal group need to monitor, and
   the video loopback request further carries an identifier of a trunking terminal comprised in each trunking terminal group that needs to monitor the video data to be looped back and a serial number of the video data to be looped back that all trunking terminals in each trunking terminal group need to monitor.

2. The method according to claim 1, wherein before the sending the video data to be looped back to a trunking terminal, the method further comprises:
   allocating a radio network temporary identifier to each stream of video data to be looped back; and
   sending first monitoring indication information to the trunking terminal or sending a first video loopback response to the video capture terminal;
   wherein the first monitoring indication information carries the radio network temporary identifier, the identifier of the trunking terminal comprised in each trunking terminal group, and the serial number of the video data to be looped back that all trunking terminals in each trunking terminal group need to monitor, so that the trunking terminal confirms, according to an identifier of the trunking terminal itself, the serial number of the video data to be looped back that all trunking terminals in a trunking terminal group comprising the trunking terminal itself need to monitor, confirms, according to the serial number of the video data to be looped back and monitored, the video data to be looped back and monitored, and uses the radio network temporary identifier to monitor the video data to be looped back; and
   the first video loopback response carries the radio network temporary identifier allocated to each stream of video data to be looped back, so that the video capture terminal sends a second video loopback response to the dispatch station, wherein the second video loopback response carries the serial number of each stream of video data to be looped back and the radio network temporary identifier of each stream of video data to be looped back, so that the dispatch station sends second monitoring indication information to the trunking terminal, wherein the second monitoring indication information carries the radio network temporary identifier, the identifier of the trunking terminal comprised in each trunking terminal group, and the serial number of the video data to be looped back that all trunking terminals in each trunking terminal group need to monitor, so that the trunking terminal confirms, according to the identifier of the trunking terminal itself, the serial number of the video data to be looped back that all trunking terminals in the trunking terminal group comprising the trunking terminal itself need to monitor, confirms, according to the serial number of the video data to be looped back and monitored, the video data to be looped back and monitored, and uses the radio network temporary identifier to monitor the video data to be looped back.

3. The method according to claim 1 further comprising:
   receiving a bearer modification request sent by the mobility management entity; and modifying a video data transmission bearer, and confirming a mapping relationship between an identifier of the modified transmission bearer and an identifier of the transmission bearer before the modification.

4. A data transmission method, comprising:
receiving a bearer setup request sent by a video capture terminal, wherein the bearer setup request carries a serial number of N streams of video data;
setting up N evolved packet bearers, each of which is used to transmit one of the N streams of video data, and correspondingly storing an identifier of each bearer used for transmitting the one stream of video data and a serial number of the one stream of video data transmitted on the bearer, wherein N is an integer greater than or equal to 1;
receiving a video loopback request sent by a dispatch station, wherein the video loopback request carries a serial number of video data to be looped back;
searching, according to the serial number of the video data to be looped back, a stored mapping relationship between a serial number of video data and an identifier of a bearer, for an identifier of a bearer corresponding to the serial number of the video data to be looped back; and
sending loopback indication information to a base station, wherein the loopback indication information carries the found identifier of the bearer of the video data to be looped back, so that the base station confirms, according to the identifier of the bearer of the video data to be looped back, the video data to be looped back corresponding to the identifier of the bearer of the video data to be looped back, and sends the video data to be looped back to a trunking terminal,
wherein the video loopback request further carries an identifier of a trunking terminal comprised in each trunking terminal group that needs to monitor the video data to be looped back and a serial number of the video data to be looped back that all trunking terminals in each trunking terminal group need to monitor, and
the loopback indication information further carries the identifier of the trunking terminal comprised in each trunking terminal group that needs to monitor the video data to be looped back and the serial number of the video data to be looped back that all trunking terminals in each trunking terminal group need to monitor.

5. The method according to claim 4, further comprising:
sending a bearer modification request to the base station, so that the base station modifies a video data transmission bearer, and confirms a mapping relationship between an identifier of the modified transmission bearer and an identifier of the transmission bearer before the modification.

6. A base station, comprising:
at least one memory configured to store at least one instruction; and
at least one hardware processor configured to, including configured by the at least one instruction to:
receive N streams of video data uploaded by a video capture terminal, and receive loopback indication information sent by a mobility management entity or the video capture terminal, wherein the loopback indication information carries an identifier of a bearer of video data to be looped back, wherein the identifier of the bearer is an identifier of each bearer among N bearers that are set up by the mobility management entity according to a bearer setup request of the video capture terminal and are used for transmitting the N streams of video data, wherein the bearer setup request carries a serial number of the N streams of video data, the serial number of each stream of video data corresponds to the identifier of the bearer used for transmitting each stream of video data, and the identifier of the bearer of the video data to be looped back is determined by the mobility management entity or the video capture terminal according to a serial number of the video data to be looped back carried in a video loopback request of a dispatch station, wherein N is an integer greater than or equal to 1;
confirm, according to the identifier of the bearer of the video data to be looped back received by the at least one hardware processor, the video data to be looped back corresponding to the identifier of the bearer of the video data to be looped back; and
send the video data to be looped back confirmed by the at least one hardware processor to a trunking terminal,
wherein the video loopback request further carries an identifier of a trunking terminal comprised in each trunking terminal group that needs to monitor the video data to be looped back and a serial number of the video data to be looped back that all trunking terminals in each trunking terminal group need to monitor.

7. The base station according to claim 6, wherein the at least one hardware processor is further configured to:
allocate a radio network temporary identifier to each stream of video data to be looped back confirmed by the at least one hardware processor; and
send first monitoring indication information to the trunking terminal or send a first video loopback response to the video capture terminal;
wherein the first monitoring indication information carries the radio network temporary identifier, an identifier of a trunking terminal comprised in each trunking terminal group, and a serial number of the video data to be looped back that all trunking terminals in each trunking terminal group need to monitor, so that the trunking terminal confirms, according to an identifier of the trunking terminal itself, the serial number of the video data to be looped back that all trunking terminals in a trunking terminal group comprising the trunking terminal itself need to monitor, confirms, according to the serial number of the video data to be looped back and monitored, the video data to be looped back and monitored, and uses the radio network temporary identifier to monitor the video data to be looped back; and
the first video loopback response carries the radio network temporary identifier allocated to each stream of video data to be looped back, so that the video capture terminal sends a second video loopback response to the dispatch station, wherein the second video loopback response carries the serial number of each stream of video data to be looped back and the radio network temporary identifier of each stream of video data to be looped back, so that the dispatch station sends second monitoring indication information to the trunking terminal, wherein the second monitoring indication information carries the radio network temporary identifier, the identifier of the trunking terminal comprised in each trunking terminal group, and the serial number of the video data to be looped back that all trunking terminals in each trunking terminal group need to monitor, so that the trunking terminal confirms, according to the identifier of the trunking terminal itself, the serial number of the video data to be looped back that all trunking terminals in the trunking terminal group comprising the trunking terminal itself need to monitor, confirms, according to the serial number of the video data to be looped back and monitored, the video data to be looped back and monitored, and uses the radio network temporary identifier to monitor the video data to be looped back.

8. The base station according to claim 6, wherein:
the at least one hardware processor is further configured to receive a bearer modification request sent by the mobility management entity;
modify a video data transmission bearer after the at least one hardware processor receives the bearer modification request; and
confirm a mapping relationship between an identifier of the transmission bearer modified by the at least one hardware processor and an identifier of the transmission bearer before the modification.

9. A mobility management entity, comprising:
at least one memory configured to store at least one instruction; and
at least one hardware processor configured to, including configured by the at least one instruction to:
receive a bearer setup request sent by a video capture terminal, wherein the bearer setup request carries a serial number of N streams of video data;
set up N evolved packet bearers after the at least one hardware processor receives the bearer setup request, wherein each bearer is used to transmit one of the N streams of video data;
correspondingly store, after the at least one hardware processor sets up the bearers, an identifier of each bearer used for transmitting the one stream of video data and a serial number of the one stream of video data transmitted on the bearer, wherein N is an integer greater than or equal to 1;
receive a video loopback request sent by a dispatch station, wherein the video loopback request carries a serial number of video data to be looped back;
search, according to the serial number of the video data to be looped back received by the at least one hardware processor, the stored mapping relationship between a serial number of video data and an identifier of a bearer, for an identifier of a bearer corresponding to the serial number of the video data to be looped back; and
send loopback indication information to a base station, wherein the loopback indication information carries the found identifier of the bearer of the video data to be looped back, so that the base station confirms, according to the identifier of the bearer of the video data to be looped back, the video data to be looped back corresponding to the identifier of the bearer of the video data to be looped back, and sends the video data to be looped back to a trunking terminal,
wherein the video loopback request further carries an identifier of a trunking terminal comprised in each trunking terminal group that needs to monitor the video data to be looped back and a serial number of the video data to be looped back that all trunking terminals in each trunking terminal group need to monitor.

10. The mobility management entity according to claim 9, wherein:
the at least one hardware processor is further configured to send a bearer modification request to the base station, so that the base station modifies a video data transmission bearer, and confirms a mapping relationship between an identifier of the modified transmission bearer and an identifier of the transmission bearer before the modification.

11. A video capture terminal, comprising:
at least one memory configured to store at least one instruction; and
at least one hardware processor configured to, including configured by the at least one instruction to:
send, after negotiating with a dispatch station about a serial number of N streams of video data to be reported, the N streams of video data corresponding to the serial number of the N streams of video data to a base station, and send a bearer setup request to a mobility management entity, wherein the bearer setup request carries the serial number of the N streams of video data, so that the mobility management entity sets up N evolved packet bearers, each of which is used to transmit one of the N streams of video data, and correspondingly stores an identifier of each bearer used for transmitting the one stream of video data and a serial number of the one stream of video data transmitted on the bearer;
receive a video loopback request sent by the dispatch station, wherein the video loopback request carries a serial number of video data to be looped back; and
determine, according to the serial number of the video data to be looped back carried in the video loopback request received by the at least one hardware processor, an identifier of a bearer of the video data to be looped back; and
send loopback indication information to the base station, wherein the loopback indication information carries the identifier of the bearer of the video data to be looped back, so that the base station confirms, according to the identifier of the bearer of the video data to be looped back, the video data to be looped back corresponding to the identifier of the bearer of the video data to be looped back, and sends the video data to be looped back to a trunking terminal,
wherein the at least one hardware processor is further configured to receive a first video loopback response sent by the base station, wherein the first video loopback response carries a radio network temporary identifier allocated to each stream of video data to be looped back,
wherein the loopback indication information further carries an identifier of a trunking terminal comprised in each trunking terminal group that needs to monitor the video data to be looped back and a serial number of the video data to be looped back that all trunking terminals in each trunking terminal group need to monitor.

12. The video capture terminal according to claim 11, wherein:
the at least one hardware processor is further configured to send a second video loopback response to the dispatch station after the at least one hardware processor receives the first video loopback response, wherein the second video loopback response carries the serial number of each stream of video data to be looped back and the radio network temporary identifier of each stream of video data to be looped back, so that the dispatch station sends second monitoring indication information to the trunking terminal, wherein the second monitoring indication information carries the radio network temporary identifier, an identifier of a trunking terminal comprised in each trunking terminal group, and a serial number of video data to be looped back that all trunking terminals in each trunking terminal group need to monitor, so that the trunking terminal confirms, according to an identifier of the trunking terminal itself, a serial number of the video data to be looped back that all trunking terminals in a trunking terminal group comprising the trunking terminal itself need to monitor, confirms, according to the serial number of the video data to be looped back and monitored, the video data to be looped back and monitored, and uses the radio network temporary identifier to monitor the video data to be looped back.

* * * * *